US006185321B1

(12) United States Patent
Fukushima et al.

(10) Patent No.: US 6,185,321 B1
(45) Date of Patent: Feb. 6, 2001

(54) IMAGE FORMING SYSTEM

(75) Inventors: Tamotsu Fukushima, Nara; Yasuhiro Nakai, Soraku-gun; Masakatsu Nakamura, Kashihara; Syoichiro Yoshiura, Tenri; Hidemoto Nishiyama, Yamatokoriyama, all of (JP)

(73) Assignee: Sharp Kabushiki Kaisha, Osaka (JP)

( * ) Notice: Under 35 U.S.C. 154(b), the term of this patent shall be extended for 0 days.

(21) Appl. No.: 09/010,355

(22) Filed: Jan. 21, 1998

(30) Foreign Application Priority Data

Jan. 21, 1997 (JP) .................................................. 9-008982

(51) Int. Cl.[7] ...................................................... G06K 9/00
(52) U.S. Cl. ............................................................ 382/135
(58) Field of Search ..................................... 382/100, 135, 382/137, 155, 181, 190, 209, 217, 224, 278, 312, 318

(56) References Cited

U.S. PATENT DOCUMENTS

| 4,558,176 | * | 12/1985 | Arnold et al. | 178/22.08 |
| 5,321,470 | * | 6/1994 | Hasuo et al. | 355/201 |
| 5,390,003 | * | 2/1995 | Yamaguchi et al. | 355/201 |
| 5,430,525 | * | 7/1995 | Ohta et al. | 355/201 |
| 5,586,228 | * | 12/1996 | Tokishige et al. | 395/115 |
| 5,689,755 | | 11/1997 | Ataka | 399/8 |
| 5,790,932 | * | 8/1998 | Komaki et al. | 399/366 |

FOREIGN PATENT DOCUMENTS

| 53-116834 | 12/1978 | (JP) . |
| 6-60165 | 4/1994 | (JP) . |

* cited by examiner

Primary Examiner—Phuoc Tran
Assistant Examiner—Seyed Azarian
(74) Attorney, Agent, or Firm—Dike, Bronstein, Roberts & Cushman, LLP; David G. Conlin; David A. Tucker

(57) ABSTRACT

In an image forming system, a digital copying machine, which is requested to determine image data, stores determination history data including a result of determination in its memory when the result indicates that the image data are prohibited to be copied, and transfers the determination history data to a digital copying machine of a requesting end, and also transfers the determination history data automatically or as requested to other digital copying machine, a central image formation control unit or a host computer of the service center. As a result, an inhibit copy action can be prevented even when a digital copying machine being used within the system is not provided with an image determining function, thereby providing a security system which can inform others of an occurrence of an illegal or dishonest action at real time.

27 Claims, 27 Drawing Sheets

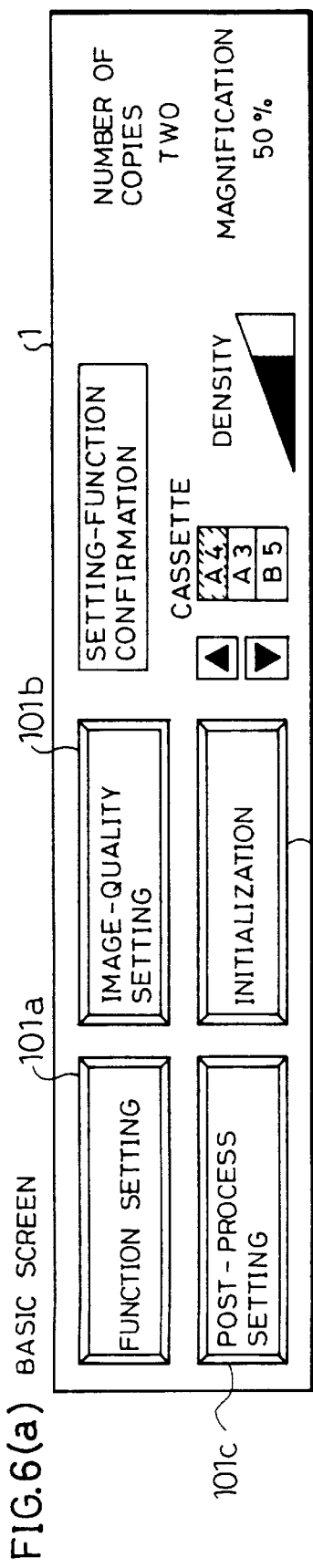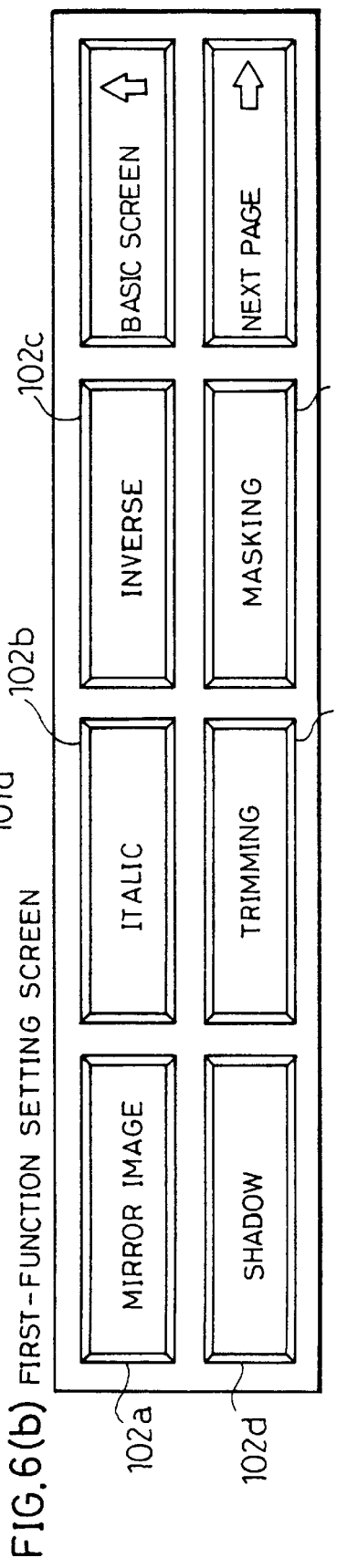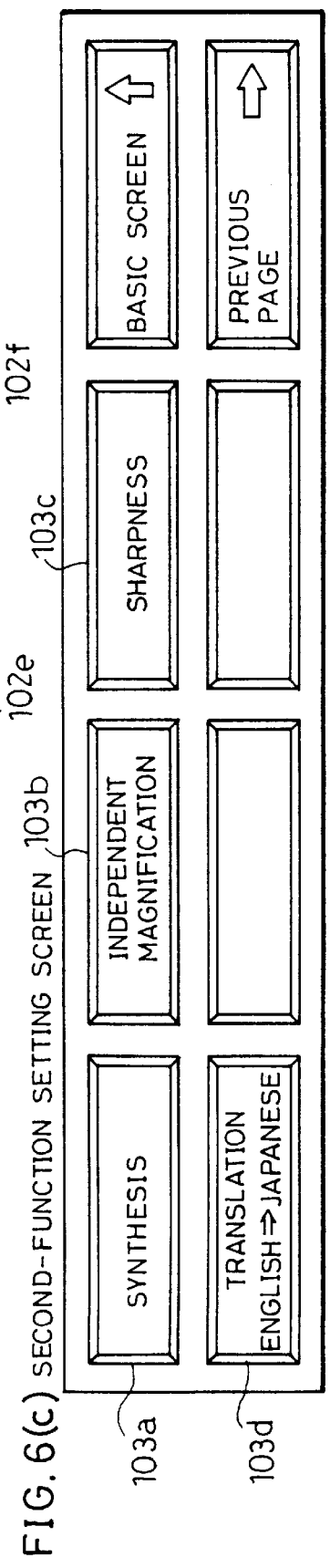

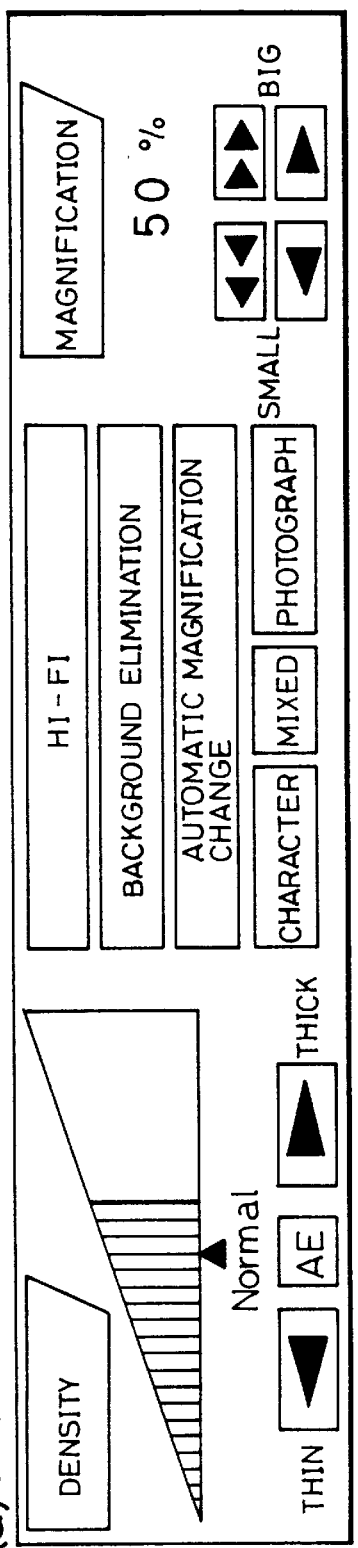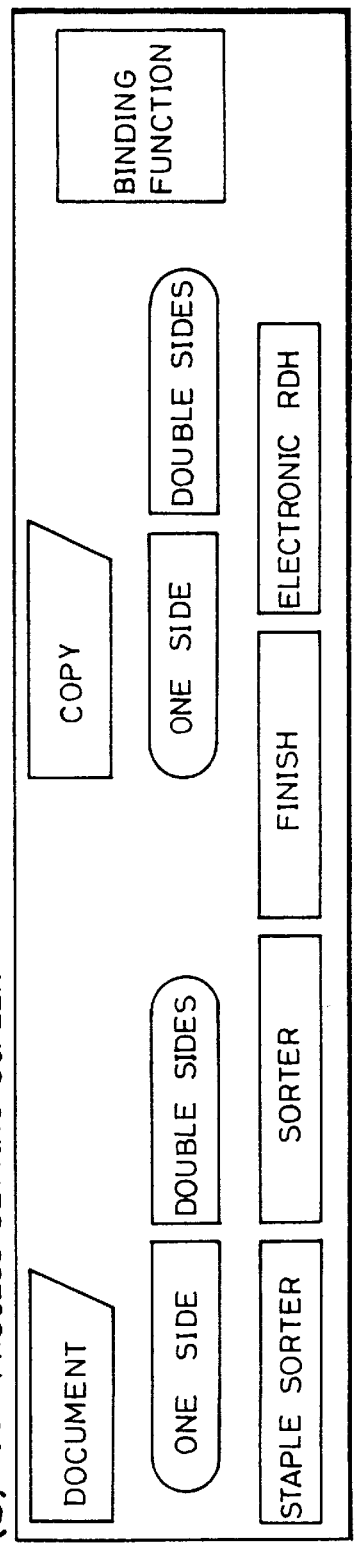
FIG.7(a) IMAGE-QUALITY SETTING SCREEN
FIG.7(b) POST-PROCESS SETTING SCREEN

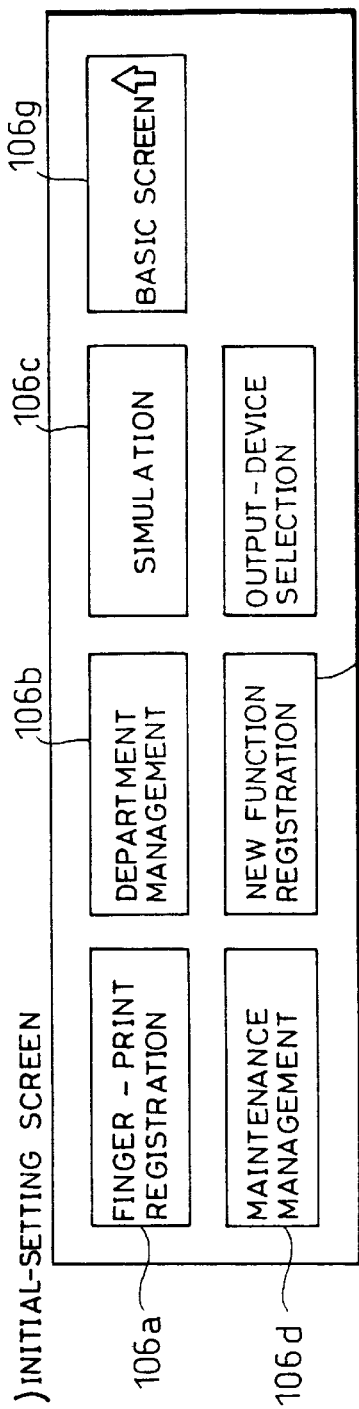
FIG.8(a) INITIAL-SETTING SCREEN
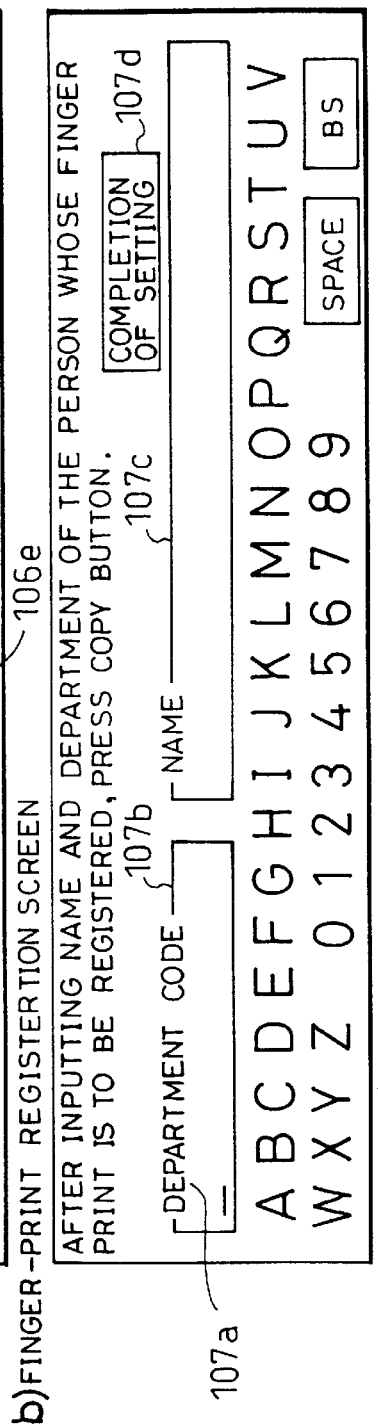
FIG.8(b) FINGER-PRINT REGISTERTION SCREEN
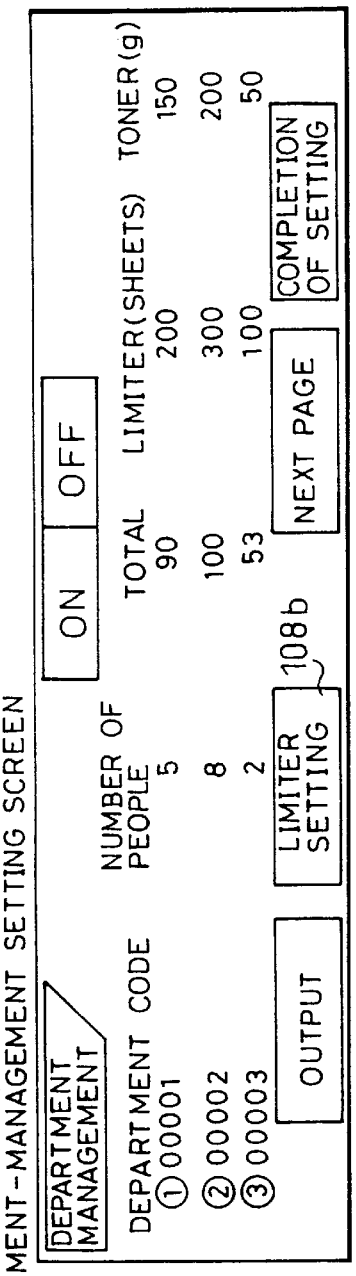
FIG.8(c) DEPARTMENT-MANAGEMENT SETTING SCREEN

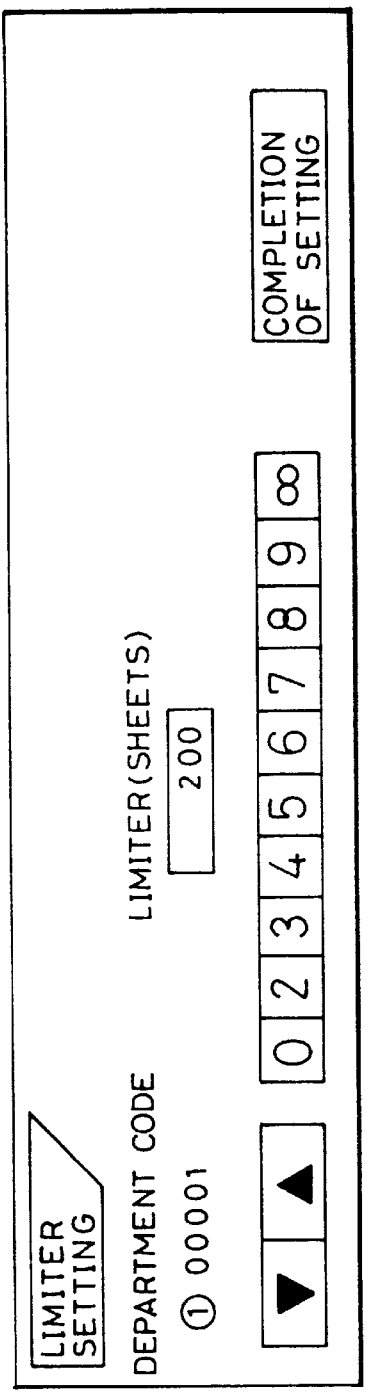
FIG.9(a) LIMITER SETTING SCREEN
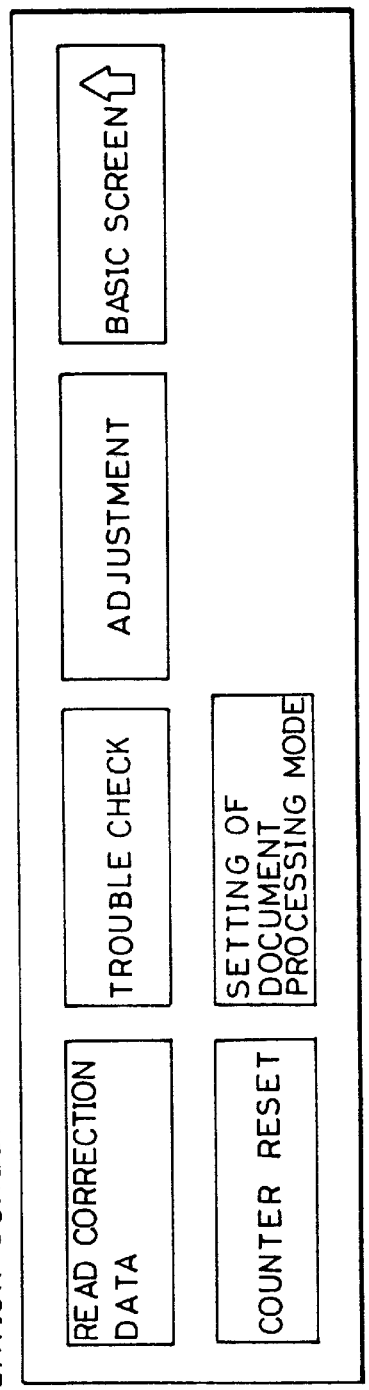
FIG.9(b) SIMULATION SCREEN

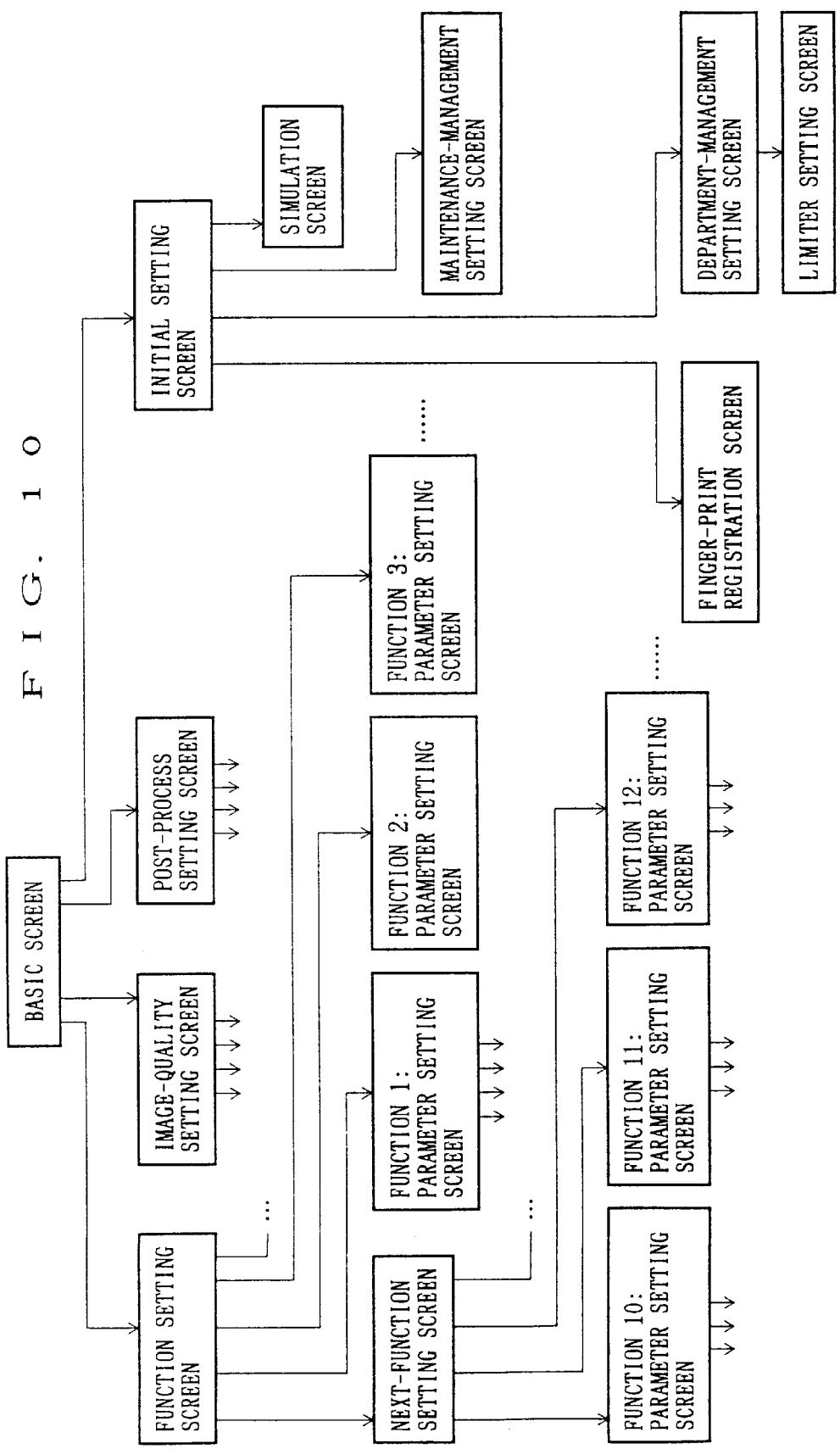

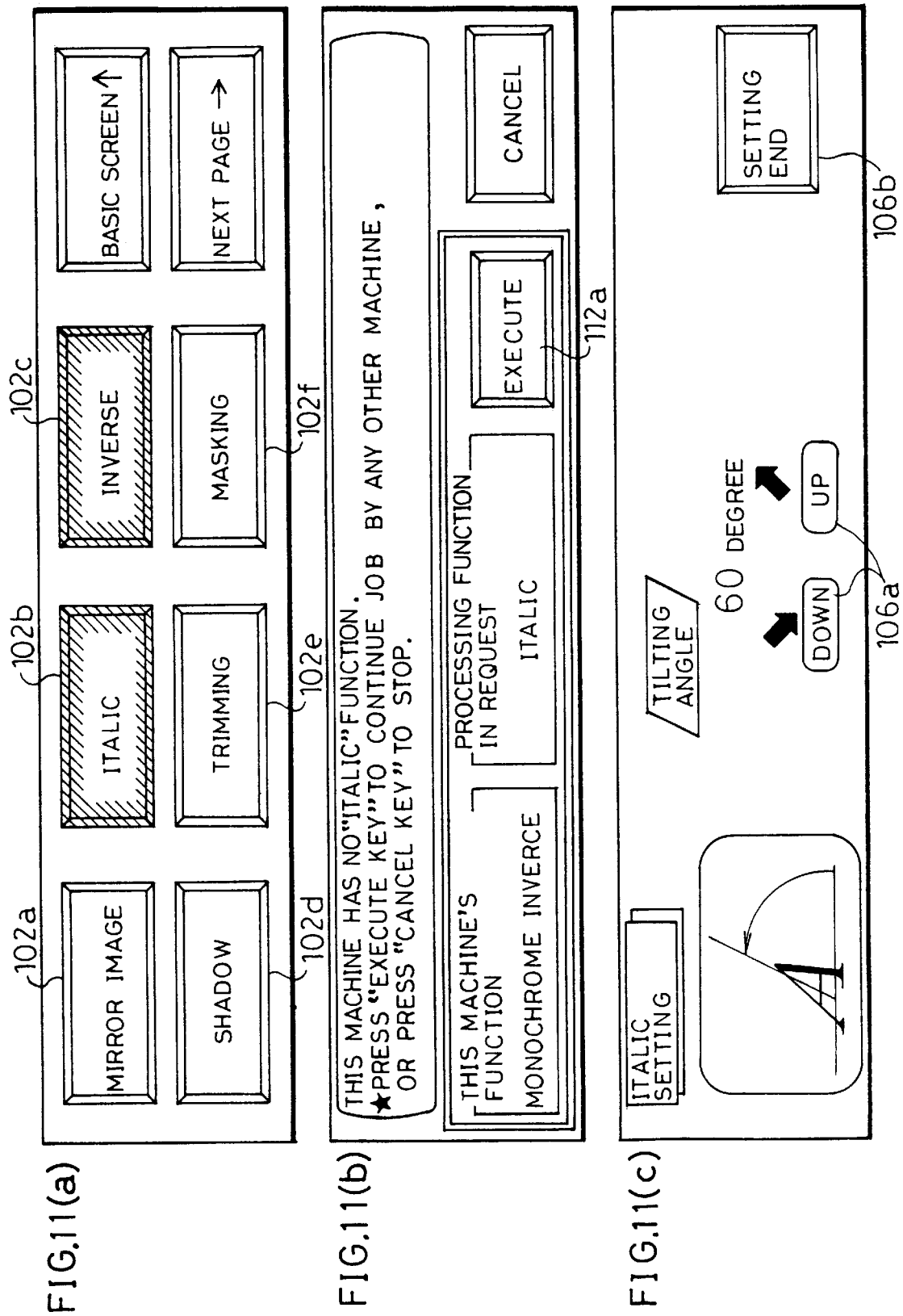

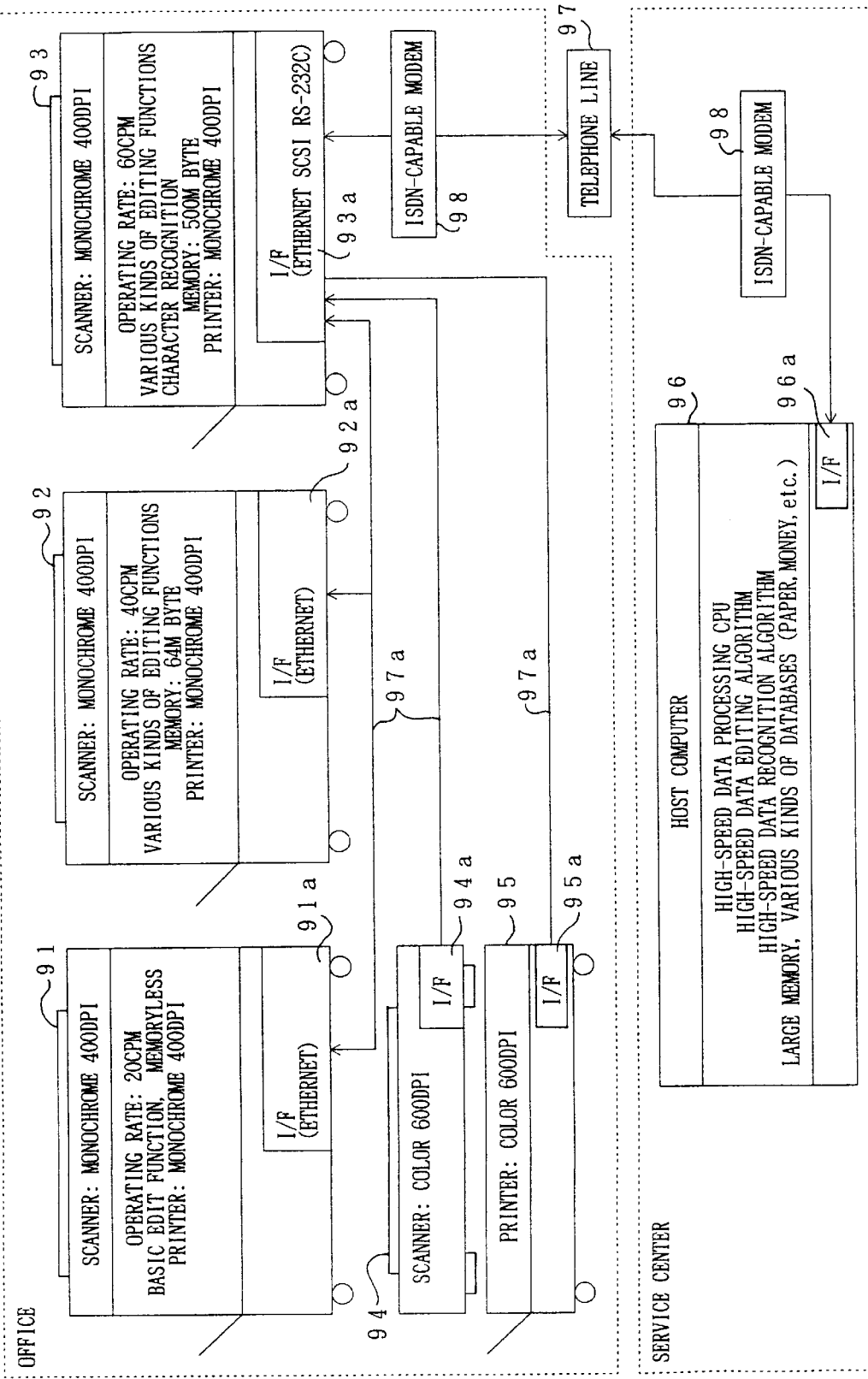

FIG. 19 (a)
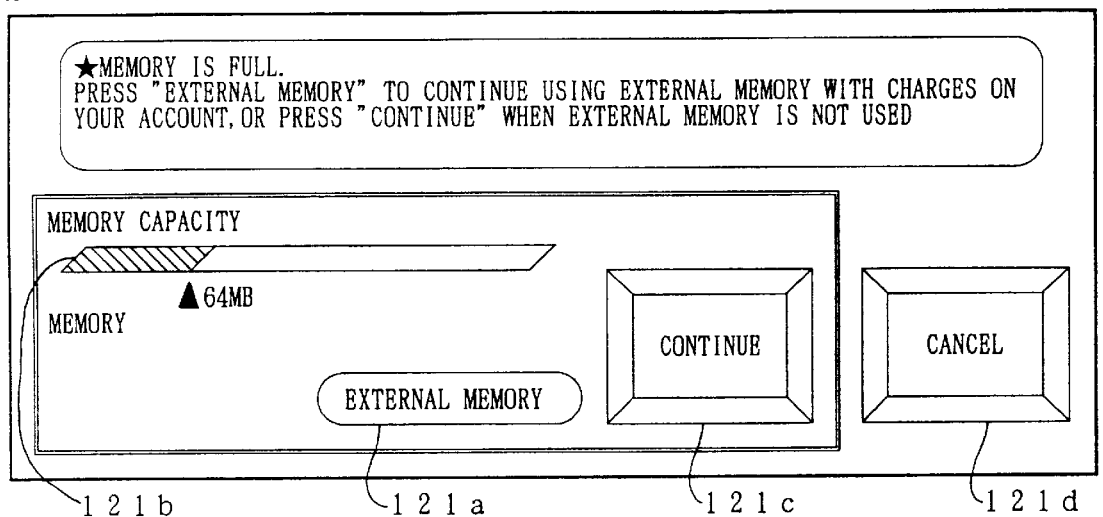
FIG. 19 (b) (WHEN EXTERNAL MEMORY SELECTION KEY IS PRESSED)
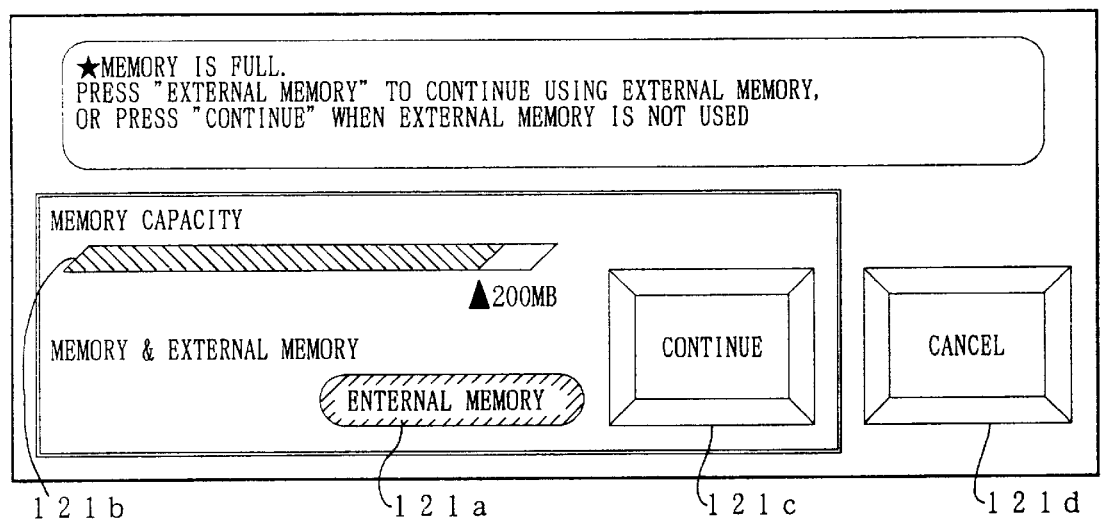
FIG. 19 (c) (WHEN CONTINUE KEY IS PRESSED)
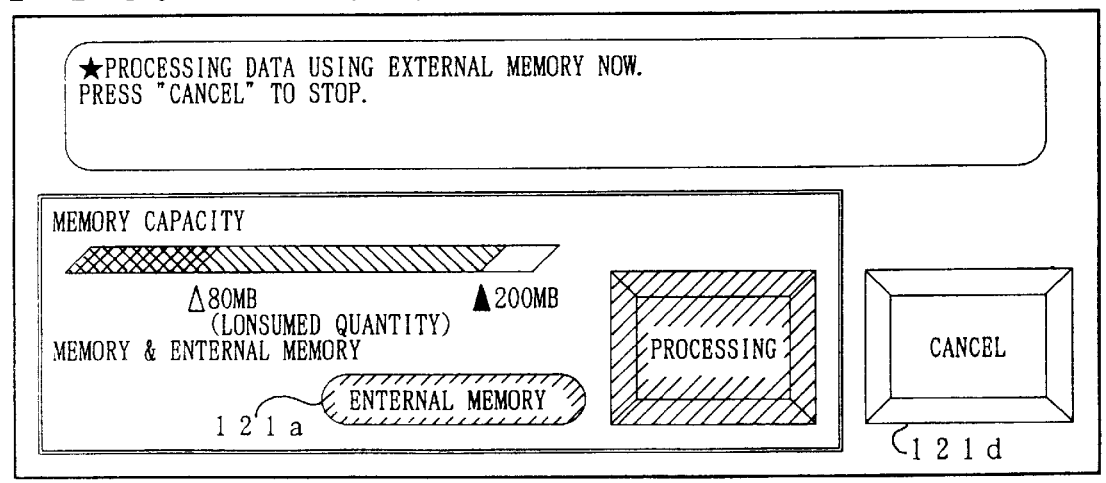

FIG. 21 (a)

THE COPYING OF IMAGE AS READ IS PROHIBITED BY LAW.
COPYING OPERATION IS STOPPED.

CONFIRM

FIG. 21 (b)

THE COPYING OF IMAGE AS READ MAY BE PROHIBITED BY LAW.
COPY WILL BE MADE WITH LOWER IMAGE QUALITY.

CONFIRM

FIG. 21 (c)

THE COPYING OF IMAGE AS READ MAY BE PROHIBITED BY LAW.
SHALL THE COPYING BE COMPLETED ?

YES    NO

IMAGE QUALITY IS BEING ADJUSTED
PLEASE WAIT

PLEASE WAIT
RECOVERING FROM POWER SAVE MODE

IMAGE FORMING SYSTEM

FIELD OF THE INVENTION

The present invention relates to an image forming system including a main image forming apparatus such as a computer device provided with an image data processing function, a digital copying machine, etc., and sub-image forming apparatuses such as digital copying machines for printing the image data as processed, wherein the main image forming apparatus and the sub-image forming apparatuses are connected via a communication device so as to allow communication between them.

BACKGROUND OF THE INVENTION

A digital copying machine as an example commercialized image forming apparatus produces a copy of an original image in the following manner. First, the original image is read by means of an image reading section. Then, the document image as read is subjected to the image processing function as specified, and the resulting image data are printed out by a recording section. In the digital copying machine, an image can be formed on the sheet by utilizing the image processing function of the digital copying machine.

On the other hand, an idea of constituting a network by interconnecting a plurality of image recording apparatuses or the like has been proposed. For example, Japanese Unexamined Patent Application No. 116834/1978 (Tokukaisho 53-116834) discloses an arrangement wherein a plurality of image reading apparatuses and a plurality of image recording apparatuses are connected by a single control section.

According to the described arrangement, a copy of an original image as read by any one of the plurality of image reading apparatuses is printed out by any one of the plurality of image recording apparatuses. This arrangement reduces a stand-by time of the image-reading apparatus required for carrying out such processes as a replacement of an original document in the image-reading apparatus, etc.

Japanese Unexamined Patent Application No. 198958/1986 (Tokukaisho 61-198958) discloses an image forming system wherein a plurality of copying machines including an image reading section and an image recording section are connected by a control device. In the image forming system, according to a document copy mode as set, an image signal to be recorded is distributed into a plurality of copying machines, and a copying operation is performed parallelly in the plurality of copying machines.

Japanese Unexamined Patent Publication No. 285977/1989 (Tokukaihei 1-285977) discloses an image processing section including determination means for determining if a copying of image data as read by an image reading section is permitted, i.e., if a duplication of the document image is prohibited, and has a function of controlling a copy output based on an output from the determination means when processing the document image.

However, the described conventional image forming systems have drawbacks in that a document image which is prohibited to be formed or processed cannot be prevented effectively.

For example, in the conventional digital copying machine, the determination means for determining if a copying of the image is permitted is incorporated in an image processing machine. The determination means basically has such a function that copy-prohibited data such as marketable securities, etc., are stored in a unit beforehand, and the determination of the image is carried out by collating the document image data with the copy-prohibited data as stored. In the described arrangement, as the unit is fixed in the digital copying machine, the data may be damaged as being stored for a long time within the unit, which causes an erroneous result when determining if the document is permitted to be copied.

Additionally, in the described digital copying machine provided with the determination means, a control of the copy-prohibited document image as processed is permitted; however, the copy-prohibited document can be copied by other image processing apparatus which is not provided with the determination means.

Furthermore, even after a new image processing apparatus provided with determination means of a higher level becomes available in the market with an increase in an amount of data or an improvement in algorithm, a determination still has to be carried out by the existing determination means of the image processing apparatus. For this reason, in the case where the determination means of a desired level is not provided in the digital copying machine of one's possession, or a digital copying machine provided with the determination means of a higher level becomes available in the market, the user is required to purchase a new digital copying machine only for obtaining the determination function of a higher level or improving the precision of the result of determination.

SUMMARY OF THE INVENTION

It is therefore an object of the present invention to provide an image forming system which can prevent an inhibit copy action even when using an image forming apparatus without an image determination function or with a simple image determining function.

In order to achieve the above object, the first image forming system of the present invention is characterized by including: a plurality of image forming apparatuses including at least one main image forming apparatus and at least one sub image forming apparatus; and a communication device for connecting the main image forming apparatus and the sub image forming apparatus to allow data to be transmitted and received between them, wherein the sub image forming apparatus includes a sub control section for transmitting image data to the main image forming apparatus via the communication device and requesting the main image forming apparatus to determine if the image data as transmitted are prohibited to be copied, the main image forming apparatus includes an image data determining section for determining if the image data as received via the communication device are prohibited to be copied and a main control section for transmitting determination history data including a result of determination via the communication device; and at least either one of the main image forming apparatus and the sub image forming apparatus includes memory means for storing the determination history data and transfer means for transferring the determination history data as stored to other image forming apparatus.

The image to be processed by the main image forming apparatus may be prohibited to be reproduced by law such as paper money, marketable securities, or may be prohibited to be copied by user setting.

In order to prevent a processing of an image which is prohibited by law or by user setting, the present invention is arranged such that the image data determining section determines if the image data as input are permitted to be processed. Here, as to whether or not it is permitted to process the image data by law or by user setting is determined by collating the image data with the registered prohibit image processes stored beforehand.

The determination history data including the result of determination, the name of the apparatus of the requesting end, the requesting data, the document size, the image data, the incidence of illegal action, the user's prohibit registration number, the incidence of violating the registered prohibit action based on the user setting are sent back to the sub image forming apparatus.

Accordingly, when the determination history data indicate that it is illegal to process the image data, the sub image forming apparatus prohibits the formation of a visible image of such prohibit image data by displaying a message indicative of the illegal action for the user, and the illegal image processing action can be prevented with respect to the image data which are prohibited to be processed by law or by user setting, thereby preventing an occurrence of an illegal action or a dishonest action of processing the image based on the user setting.

Moreover, since the described image data determining function is required to be provided only in the image forming apparatus which carries out a determination process, an increase in cost of each image forming apparatus can be eliminated.

Further, even in the image forming apparatus which is not provided with an image data determining function of high level, by transferring the image data to the main image forming apparatus provided with a determination function of a higher level, an occurrence of an erroneous determination can be prevented, and a control of an image process of higher level can be performed.

According to the arrangement of the present invention, the sub image forming apparatus includes a sub control section for transmitting image data to the main image forming apparatus via the communication device and requesting the main image forming apparatus to determine if the image data as transmitted are prohibited to be copied, the main image forming apparatus includes an image data determining section for determining if the image data as received via the communication device are prohibited to be copied and a main control section for transmitting determination history data including a result of determination via the communication device, and at least either one of said main image forming apparatus and said sub image forming apparatus includes memory means for storing said determination history data and transfer means for transferring the determination history data to other image forming apparatus.

According to the image forming system of the present invention, the determination history data can be obtained by any of the sub image forming apparatus and the main image forming apparatus. Then, as described, the determination history data of the main image forming apparatus which performs a processing of an image are stored, and an occurrence of an illegal or dishonest action, the processing condition, etc., are transferred in a form of the determination history data as requested from other image forming apparatus so as to utilize the result of determination as the determination history data to improve the precision of the determination. As a result, the image forming apparatus which frequently performs an illegal or dishonest image process can be specified, and an improved security control level such as an installation place of such apparatus, etc., can be achieved, thereby improving a security system.

Additionally, when the result of determination of the image process by the main image forming apparatus of the requesting receiving end is stored in the sub image forming apparatus of the requesting end, the priority order of selecting an apparatus of a receiving end of a request can be determined with ease based on many determination history data, thereby constituting a network environment which enables a request for processing an image to be given in an effective way.

It is another object of the present invention to provide an image forming system which offers a security system capable of informing others of an attempt of carrying out illegal action.

In order to achieve the above object, the second image forming system of the present invention having the arrangement of the first image forming system includes a central image formation control device for organizing and controlling both the main image forming apparatus and the sub image forming apparatus; a centralized control device for centrally controlling data on an inhibit copy action; a second communication device for allowing communication between the central image formation control device and the centralized control device, wherein the sub image forming apparatus transfers the determination history data to the centralized control device via the central image formation control device when the image data are specific image data upon receiving the determination history data including a result of determination indicating that the image data are prohibited to be copied from the main image forming apparatus.

According to the image forming system of the described arrangement, by informing the centralized control device of an occurrence of a dishonest action via the central image formation control device, an existence of a person who made an attempt of carrying out a dishonest action can be informed at real time.

For a fuller understanding of the nature and advantages of the invention, reference should be made to the ensuing detailed description taken in conjunction with the accompanying drawings.

BRIEF DESCRIPTION OF THE DRAWINGS

FIG. 6(a) is an explanatory view showing a basic screen of a liquid crystal display apparatus on the operational panel;

FIG. 6(b) is an explanatory view showing the first function setting screen of the liquid crystal display apparatus of FIG. 6(a);

FIG. 6(c) is an explanatory view showing the second function setting screen of the liquid crystal display apparatus of FIG. 6(a);

FIG. 7(a) is an explanatory view showing an image-quality setting screen of the liquid crystal display apparatus on the operational panel;

FIG. 7(b) is an explanatory view showing display contents of a post-process setting screen of the liquid crystal display apparatus;

FIG. 8(a) is an explanatory view showing an initial setting screen of the liquid crystal display apparatus on the operational panel;

FIG. 8(b) is an explanatory view showing a finger print registration screen of the liquid crystal display apparatus on the operational panel;

FIG. 8(c) is an explanatory view showing a department management setting screen of the liquid crystal display apparatus;

FIG. 9(a) is an explanatory view showing a limiter setting screen of the liquid crystal display apparatus on the operational panel;

FIG. 9(b) is an explanatory view showing a simulation screen of the liquid crystal display apparatus;

FIG. 10 is an explanatory view showing processes in which respective screens transfer to other screens in the liquid crystal display apparatus on the operational panel;

FIG. 11(a) is an explanatory view showing a state of selecting an image processing function in the first function setting screen shown in FIG. 6(b);

FIG. 11(b) is an explanatory view showing a display state of a liquid crystal display apparatus which is not provided with an image editing function as specified;

FIG. 11(c) is an explanatory view of a screen of selecting an italic function;

FIG. 12 is a block diagram showing schematic structure of an image forming system in accordance with one embodiment of the present invention;

FIG. 19(a) is an explanatory view showing a display state of the liquid crystal display apparatus in which the memory of the digital copying machine becomes full in the operation shown in FIG. 18;

FIG. 19(b) is an explanatory view showing a display state of the liquid crystal display apparatus when setting on the external memory selection key shown in FIG. 19(a);

FIG. 19(c) is an explanatory view showing a display state of the liquid crystal display apparatus when setting ON a continuation key shown in FIG. 19(b);

FIG. 21(a) is an explanatory view showing a display state of the liquid crystal display apparatus indicating that a document image is prohibited to be reproduced;

FIG. 21(b) is an explanatory view showing another display state of the liquid crystal display device indicating that the document image is prohibited to be reproduced;

FIG. 21(c) is an explanatory view showing a still another display state of the liquid crystal display apparatus indicating that the document image is prohibited to be reproduced;

DESCRIPTION OF THE EMBODIMENTS

The following will explain one embodiment of the present invention.

An image forming system of the present embodiment is composed of a plurality of digital copying machines serving as image forming apparatuses interconnected through a communication device.

Figure 2:
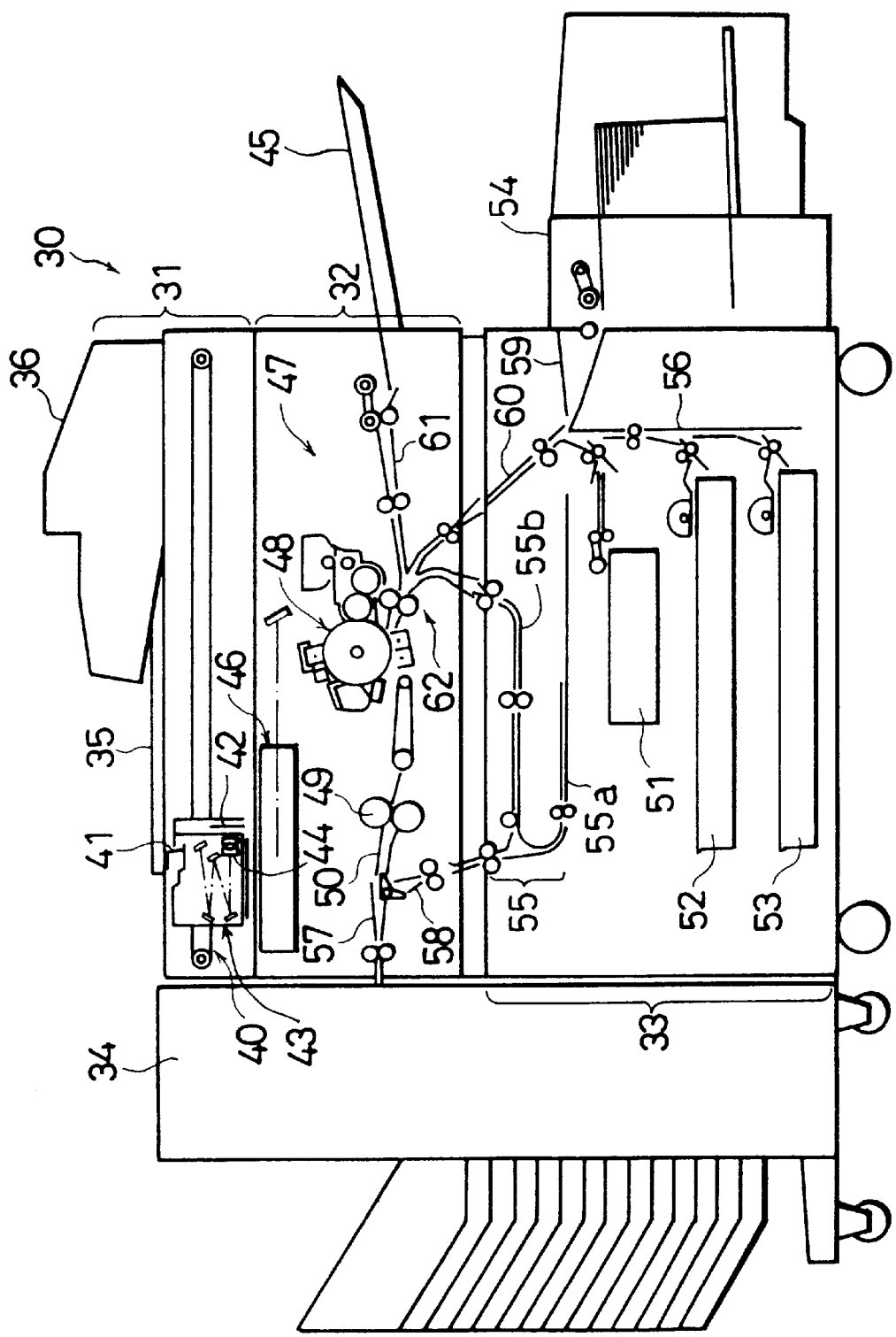
FIG. 2 is a longitudinal sectional view showing a structure of a digital copying machine of the image forming system.

FIG. 2 is a cross sectional view showing an entire structure of a digital copying machine 30 as an example of the above digital copying machine. As shown therein, the digital copying machine 30 includes a scanner section 31 serving as an image input section, a laser printer section 32 serving as an image recording section, a multi-level feed unit 33 and a post-processing device 34 having a sorter.

The scanner section 31 includes a document platen 35 made of transparent glass, an RADF (Recirculating Automatic Document Feeder) 36, and a scanner unit 40. The RADF 36 is provided for automatically feeding a document set on a predetermined document tray to the document platen 35. The scanner unit 40 is an original image reading unit for reading an original image of a document set on the document platen 35 by scanning. The document image as read by the scanner section 31 are sent to the image processing section (to be described layer) as the image data, and a predetermined image process is applied to the image data.

The multi-level feed unit 33 includes the first cassette 51, the second cassette 52, the third cassette 53 and the fourth cassette 54. The operator is permitted to add the fourth cassette 9 as an occasion demands.

In each of the cassettes 51 through 54 of the multi-level feed unit 33, a set of sheets is stored. When the operator selects the cassette which stores the sheet of the desired size, the sheets stored in the cassette are fed from the top sheet by sheet, and are transported to the laser printer section 32 in order.

The RADF 36 is provided for automatically feeding a document set on a predetermined document tray to the document platen 35 sheet by sheet. On the document tray, the document set of a plurality of sheets is set in one time. The RADF 36 includes a transport path for a one-sided document and a transport path for a double-sided document as well as a transport path switching mechanism, so that the scanner unit 40 can read either side or both sides of the document according to the selection made by the operator.

The scanner unit 40 includes a lamp reflector assembly 41, a CCD (Charge Coupled Device) 42, a plurality of reflecting mirrors 43, and a lens 44.

The lamp reflector assembly 41 is provided for scanning a document on the document platen 35 by projecting light onto the document surface. The CCD 42 is an element which converts an image formed by reflected light into an electric image signal. The reflecting mirrors 43 are provided for guiding light reflected from the document to the CCD 42. The lens 44 forms an image on the CCD 44 by converging thereon the reflected light. The scanner section 31 reads the original image to convert the same into image data by the link-up operation of the RADF 36 and the scanner unit 40. To be more specific, while the RADF 36 steadily feeds documents onto the document platen 35, the scanner unit 40 reads the original image on each document sheet by moving back and forth along the bottom surface of the document platen 35.

Figure 3:
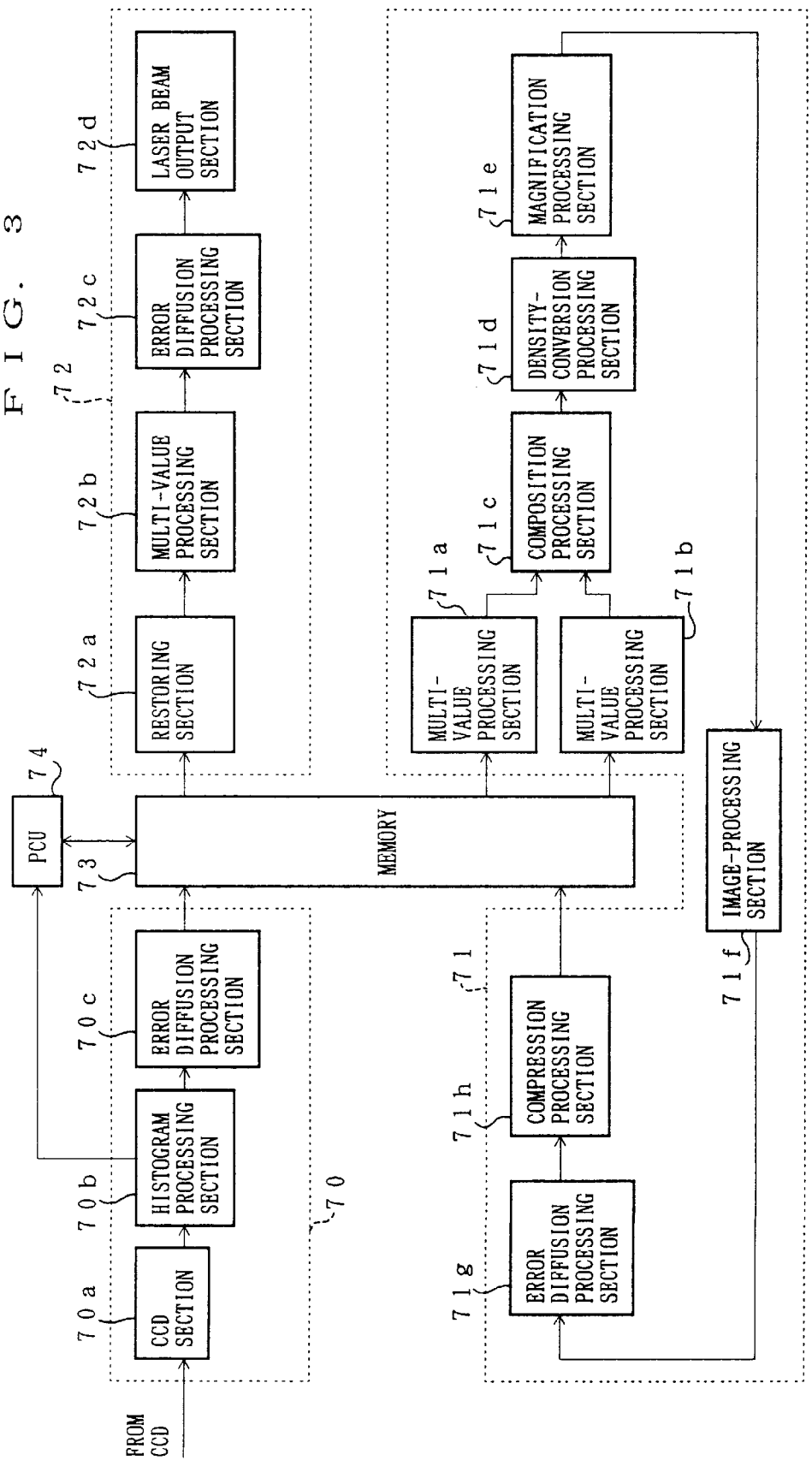
FIG. 3 is a block diagram showing a structure of an image processing section in the digital copying machine.

The image data obtained from the scanner unit 31 are sent to the image processing unit (to be described later), and after having gone through various processes, the image data are temporarily stored in memory 73 shown in FIG. 3 of the image processing section. Thereafter, the image data are applied to the laser printer section 32 according to an output instruction and are recorded as an image on the sheet.

The laser printer section 32 includes a manual document tray 45, a laser writing unit 46 and an electrophotographic processing section 47 for forming an image. The laser writing unit 46 includes a semiconductor laser, a polygon mirror, a f-θ lens, etc. The semiconductor laser is a light source for emitting a laser beam in response to the image data read from the memory 73. The polygon mirror is provided for deflecting the laser beam at constant angular velocity. The f-θ lens is provided for correcting the above deflected laser beam to be deflected at constant velocity on a photoreceptor drum 48 of the electrophotographic processing section 47, etc.

The electrophotographic processing section 47 is arranged in a known manner, that is, the same includes the photoreceptor drum 48, and around which a charger, a developer, a transferring device, a separator, a cleaner, a remover and a fuser 49, etc. are provided. A transport path 50 is formed on the downstream side of the fuser 49 in a transporting direction of sheet on which an image is to be formed.

The transport path 50 branches into two paths: a transport path 57 and a transport path 58 that communicate with the postprocessing device 34 and multi-level feeding unit 33, respectively.

The multi-level feed unit 33 includes a both-sided copy unit 55 and a common transport path 56. The both-sided copy unit 55 includes a reverse transport path 55a and a both-sided/composite transport path 55b. The reverse transport path 55a is provided for turning a sheet over. The both-sided/composite transport path 55b is provided for transporting sheets from the transport path 58 to the electrophotographic processing section 47.

The common transport path 56 is provided for transporting the sheets fed from the first cassette 51, the second cassette 52 and the third cassette 53 to the electrophotographic processing section 47. The common transport path 56 joins the transport path 59 from the fourth cassette 54 in a way to the electrophotographic processing section 47 and further communicate the transport path 60. Then, the transport path 60 joins a confluence 62 of the transport path 61 which communicates the both-sided/composite transport path 55b and the manual document tray 45, and reaches the image forming position between the photoreceptor drum 48 and the transfer unit of the electrophotographic processing section 47. The confluence 62 of three transport paths is set to a position close to the electrophotographic processing section 47.

In the laser printer section 32, the image data as read from the memory 73 of the image processing section are projected as a laser beam from the laser writing unit 46. Then, an electrostatic latent image is formed on the surface of the photoreceptor drum 48 of the electrophotographic processing section 47. As a result, an electrophotographic latent image is visualized to be a toner image. After the toner image is transported from the multi-level feed unit 33 onto the transported sheet, the toner image is made permanently affixed onto the sheet by the fuser 49.

The sheet having forming thereon an image is fed to the postprocessing device 34 through the transport paths 50 and 57 from the fuser 49. Additionally, the sheet is re-transported to the electrophotographic processing section 47 through the transport paths 50 and 58 and the both-sided copy unit 55.

The arrangement of the image processing section of the digital copying machine 30 will be explained. The image processing section is provided for performing an image process to the image data of the document resulting from the scanner unit 31. As shown in FIG. 3, the image processing section includes an image-data input section 70, an image data processing section 71, an image data output section 72, a memory 73 serving as a recording section, and, a print control unit (hereinafter referred to as PCU) 74 serving as a sub control section and a main control section.

The digital copying machine 30 is under the control of the PCU 74, which is constituted by a CPU (Central Processing Unit). The memory 73 for storing the image data is constituted by a RAM (Random Access Memory), a hard disk, etc.

The image-data input section 70 includes a CCD section 70a, a histogram processing section 70b, and an error diffusion processing section 70c. The image-data input section 70 converts the image data of the original image as read by the CCD 42 into binary data, and makes a histogram of digital amount of the binary data in order to process the image data through the error diffusion method, and stores the resulting image data in the memory 73 temporarily.

The CCD section 70a converts an analog signal representing the contrast of each pixel in the image data into a digital signal, and subsequently carries out an MTF (Modulation Transfer Function) correction, a black-and-white correction, or a gamma correction on the digital signal. Then, the CCD section 70a outputs the resulting 256 gray shades (8-bit) digital signal to the histogram processing section 70b.

The histogram processing section 70b produces density data (histogram data) by adding up the digital signal as output from the CCD section 70a separately in the 256 gray shades pixel contrast. The histogram data thus obtained are sent to the error diffusion processing section 70c as pixel data, or to the PCU 74 when occasion demands.

The error diffusion processing section 70c employs the error diffusion method known as a method of pseudo-halftone processing. To be more specific, an 8-bit/pixel digital signal as output from the CCD section 70a is converted into 1-bit (binary data) digital signal and a redistribution computation is carried out to realize a copy image rendering density as true as to the document in any specific region. In the error diffusion method, an error caused by conversion into binary data is reflected when converting the adjacent pixels into binary data.

The image data processing section 71 includes a multi-value processing sections 71a and 71b, a composition processing section 71c, a density conversion processing section 71d, a magnification processing section 71e, an image processing section 71f, and an error diffusion processing section 71g, and a compression processing section 71h. The image data processing section 71 is a processing section that converts input image data into image data as desired by the operator. Thus, the input image data are processed by the image data processing section 71 until the final output image data are stored in the memory 73. Note that, however, the aforementioned processing sections in the image data processing section 71 do not operate always, and they operate independently only when occasion demands.

The multi-value processing sections 71a and 71b convert the binary image data from the error diffusion processing section 70c into 256 gray shades data again. The composition processing section 71c carries out a logical computation for every pixel, in other words, it selectively computes an OR, an AND, and an exclusive-OR. The data subject to the logical computation are the pixel data stored in the memory 73 and bit data from a pattern generator (PG).

The density conversion processing section 71d sets an arbitrary relationship between the input contrast and output contrast for the 256 shades data based on a predetermined level converting table. The magnification processing section 71e carries out interpolation processing for a designated magnification based on the known input data to compute the pixel data (contrast value) of the subject pixel after the magnification. Subsequently, the image data are magnified in the sub-scanning direction first, and thence in the main scanning direction based on pixel data thus computed.

The image processing section 71f processes the input image data in various manners, and collects data related to data array to extract the feature and the like. The error diffusion processing section 71g operates in the same manner as the error diffusion processing section 70c in the image-data input section 70. The compression processing section 71h compresses the binary data by a coding method known as a run-length. The image data are compressed in the last processing loop after the final output image data have been produced.

The image-data output section 72 includes a restorage section 72a, a multi-value processing section 72b, an error diffusion processing section 72c, and a laser beam output section 72d. The image-data output section 72 restores the compressed image data stored in the memory 73 to the 256 gray shades data, and diffuses the error in quaternary data which, when formed into an image, renders a smoother half-tone representation than the one formed by the binary data, to transfer the resulting data to the laser beam output section 72d.

The restoring section 72a restores the data compressed by the compression processing section 71h. The multi-value processing section 72b operates in the same manner as the multi-value processing sections 71a and 71b in the image-data processing section 71. The error diffusion processing section 72c operates in the same manner as the error diffusion processing section 70c in the image-data input section 70.

The laser beam output section 72d converts the digital image data into a laser ON/OFF signal based on a control signal from a sequence controller (not shown). The semiconductor laser in the laser writing unit 46 comes on or goes off based on the above ON/OFF signal to write in an electrostatic latent image on the photoreceptor drum 48.

The data that enter into the image-data input section 70 and come out from the image data output section 72 are, as a general rule, stored in the memory 73 in the form of binary data to reduce an occupied space in the memory 73. However, the data may be stored in the form of quatanary data to maintain the quality of the image data.

Figure 4:
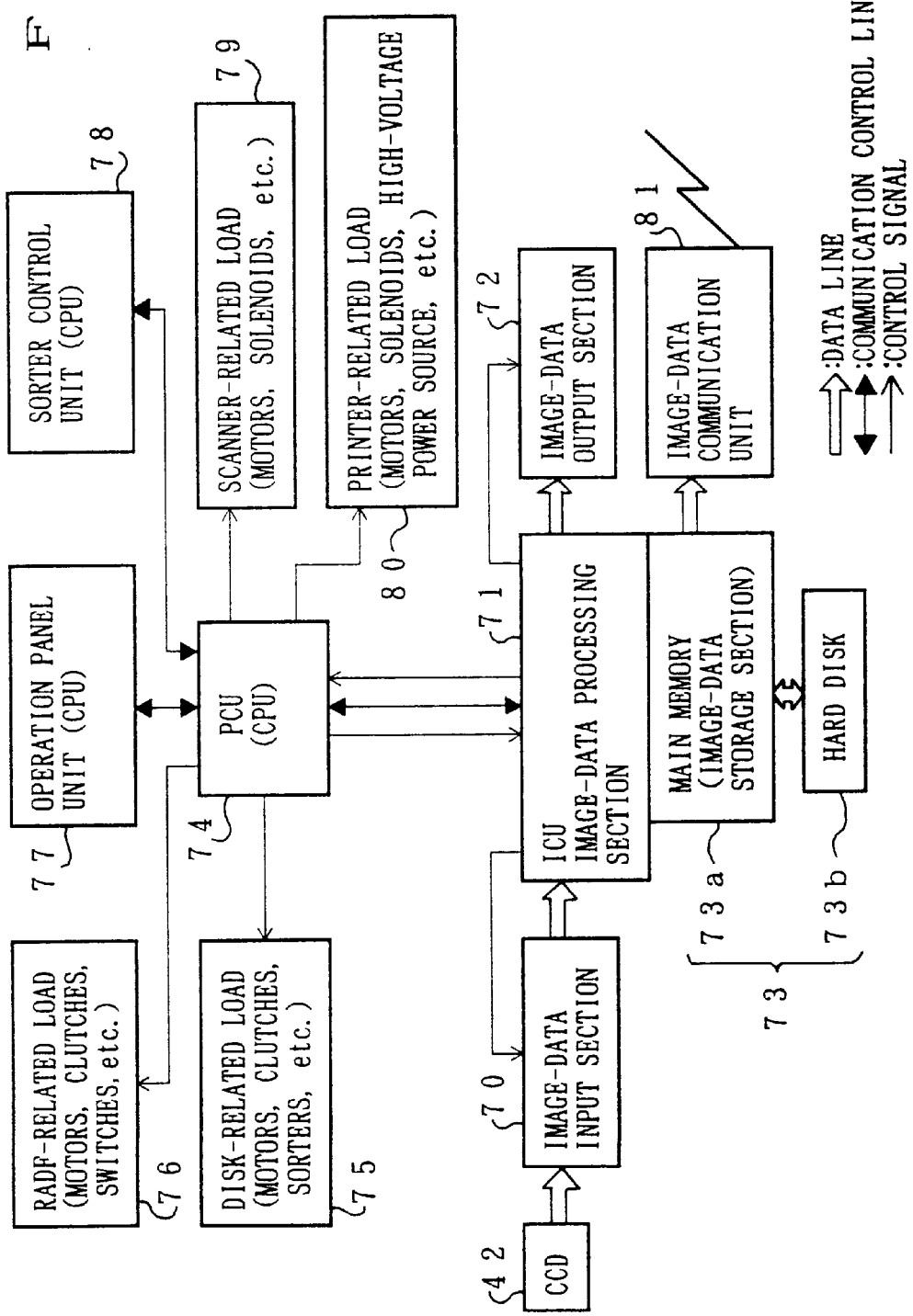
FIG. 4 is a block diagram showing a structure of a control system in the digital copying machine.

The PCU 74 controls the overall operation of the digital copying machine 30, and the control mechanism in the PCU 74 is illustrated in FIG. 4.

As shown in FIG. 4, the PCU 74 is connected to a disk-related load 75, a RADF-related load 76, a operational panel unit 77, a sorter control unit 78, a scanner-related load 79, a printer-related load 80, and the image-data processing section 71.

The PCU 74 manages the foregoing components separately using the sequence control by outputting a control signal to each. The disk-related load 75 is a load of the components other than the digital copying machine main body, that is, a load of the motor, clutch, etc., of the sorter in the postprocessing device 34. The RADF-related load 76 is a load of the motor, clutch, switch, etc., of the RADF 36. The scanner-related load 79 is a load of the motor, solenoid, etc., of the scanner unit 40. The printer-related load S0 is a load of the motor, solenoid, high-voltage power source, etc., of the electrophotographic processing section 47.

The sorter control unit 78 includes a CPU and controls the operation of the sorter based on the control signal from the PCU 74.

The control substrate unit 77 is an input section including a CPU, through which the operator sets functions such as a copying mode, etc., and enters a command in the digital copying machine 30. The control substrate unit 77 transfers the control signal to the PCU 74 in response to a mode set by the operator's input manipulation, for example, a copying mode. The PCU 74 controls the digital copying machine 30 to operate in the set mode using the control signal. On the other hand, the PCU 74 transfers the control signal indicating the operating condition of the digital copying machine 30 to the control substrate unit 77. The control substrate unit 77 displays the current operating condition of the digital copy machine 30 on the display section in response to the control signal to inform the same to the operator.

The memory 73, connected to the image data processing portion 71, is composed of a main memory 73a made of, for example, a semiconductor memory, and a hard disk 73b. An image data transmitting unit 81, connected to the main memory 73a, is provided to allow the mutual transmission between the digital copying machine 30 and the other digital data apparatuses with respect to the image data, image control signal and the like. The image data transmitting unit 81 corresponds, for example, an interface 93a, or to the interface 93a and a modem 98 in the digital copying machine 93, for example, shown in FIG. 12.

Figure 5:
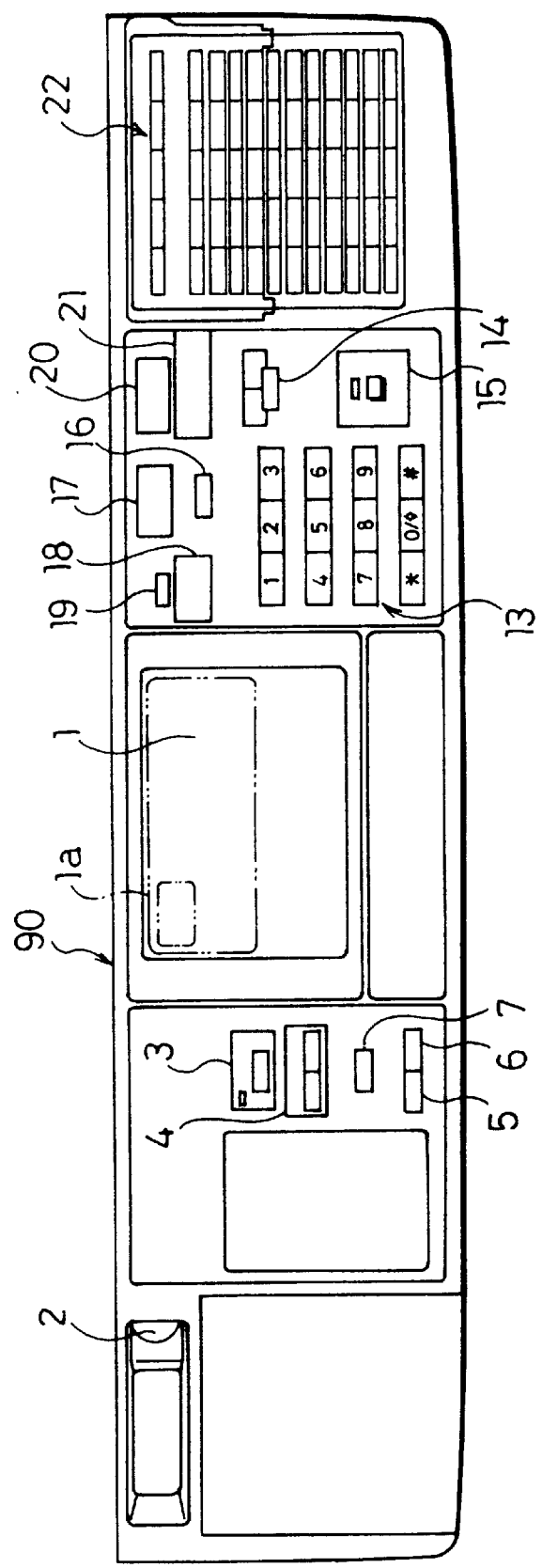
FIG. 5 is a front view of an operational panel attached to the digital copying machine.

The control substrate unit 77 includes a control panel 90 shown in FIG. 5. The control panel 90 includes a touch panel type display portion at the center as a liquid crystal display device 1. A screen switch command area 1a is formed in a part of the screen of the liquid crystal display device 1. The screen switch command area 1a is provided to enable the operator to input a command to switch a display screen to a screen for selecting an image edit function he wishes to use. Although it will be described in detail below, when the operator directly presses the screen switch command area 1a with his finger, a list of edit functions is displayed on the screen of the liquid crystal display device 1 to enable the operator to select his desired edit function. Thus, the operator can set his desired edit function only by pressing the corresponding region on the display area with his finger.

As shown in FIG. 5, the control panel 90 includes a dial 2 at the left edge for controlling the contrast of the screen on the liquid crystal display apparatus 1. A magnification auto-setting key 3, a zoom key 4, fixed magnification keys 5 and 6, and an equal magnification key 7 are provided between the dial 2 and the liquid crystal display apparatus 1. The operator presses the magnification auto-setting key 3 when he wishes to set a mode in which a copy magnification is automatically selected, and the zoom key 4 when he wishes to increase or decrease a copy magnification per 1 percent. The operator presses the fixed magnification key 5 or 6 when he wishes to select a fixed magnification, and the equal magnification key 7 when he wishes to reset a current copy magnification to the standard magnification (equal magnification).

Also as shown in FIG. 5, the liquid crystal display apparatus 1 includes on its right-hand position, a number setting key 13, a clear key 14, a start key 15, an all clear key 16, an interruption key 17, an operation guide key 18, a message forwarding key 19, a memory transmitting mode key 20, a copy/facsimile switching key 21, and an one-touch dial key 22. The number setting key 13 is used for setting the number of copies, and the clear key 14 when he wishes to rest the copy quantity or suspend the continuous copying operation. The operator presses the start key 15 to start the copying operation, and the all clear key 16 when he wishes to reset all the set modes to standard. The operator presses the interruption key 17 when he wishes to make a copy during the continuous copying operation, and the manipulation guide key 18 when he needs some help in manipulating the digital copying machine 30. When the manipulation guide key 18 is pressed, the manipulation instructions of the digital copying machine 30 are displayed on the liquid crystal display apparatus 1. The operator presses the message advancing key 19 when he wishes to advance the messages displayed after the manipulation guide key 18 is pressed.

The memory transmission mode key 20, copy/facsimile mode switching key 21, and one-touch dial keys 22 are the set keys related to a facsimile mode. The operator presses the memory transmission mode key 20 when he wishes to send the document data after the document data are once stored in the memory. The operator presses the copy/facsimile mode switching key 21 when he wishes to switch the digital copying machine 30 from the copy mode to the facsimile mode and vice versa. Each one-touch dial key 22 is arranged to remember a telephone number, so that the operator can make a phone call to a desired correspondent by a one-touch manipulation.

The above arrangement of the control panel 90 as to the kinds and alignment of the keys is explained as an example, and each control panel 90 may be arranged differently depending on the models of the digital copying machines 30.

The above liquid crystal display device 1 can display, for example, a basic screen of FIG. 6(a), a first function setting screen of FIG. 6(b), a second function setting screen of FIG. 6(c), an image quality setting screen of FIG. 7(a), a post-processing operation setting screen of FIG. 7(b), an initial setting screen of FIG. 8(a), a finger print registration screen of FIG. 8(b), a department management setting screen of FIG. 8(c), a limiter setting screen of FIG. 9(a), and a simulation screen of FIG. 9(b), as well as the other screens explained below.

The basic screen includes a function setting area, an image quality setting area, a post-processing operation setting area, an initial setting area, a set function confirmation manipulation area, and a cassette setting area, which correspond to set keys 101a–101d, respectively. The basic screen also displays the cassette, contrast, copy quantity, and magnification the user has set. When the user manipulates the set function confirmation manipulation area, all the functions currently set in the present image forming system are displayed on the liquid crystal display device 1.

The first function setting screen includes six areas for setting edit functions: mirror image, italic, inverse, shadow, trimming, and masking, which correspond to set keys 102a–102f, respectively. Further, the first function setting screen includes a basic screen key for returning to the basic screen and a next page key for switching to the second function setting screen.

The second function setting screen includes three areas: a synthesis function, an independent scaling function, and a translation function, which correspond to set keys 103a–103d, respectively. Also, the second function setting screen includes a basic screen key for returning to the basic screen and a previous page key for returning to the previous screen.

The image quality setting screen includes eight areas for setting the contrast, HI-FI mode (high-quality copying mode), background elimination mode, auto-scaling mode, text mode, text-picture mix mode, picture mode, and magnification. Further, the image quality setting screen displays the contrast and magnification that have been set.

The post-processing operation setting screen includes an input area for specifying whether the document is single-sided or double-sided, another input area for specifying whether a copy is single-sided or double-sided, and an area for setting a bookbinding function. The post-processing operation setting screen further includes three areas for setting post-processing functions, namely, staple sorter, sorter, and finishing, as well as an area for setting the electronic RDH (Recycle Document Handler) function. When the electronic RDH function is set, an electronic RDH processing (retrieving the document data from the memory) is carried out.

The initial setting screen includes six mode setting areas: a finger print registration mode, a department management mode, a simulation mode, a maintenance management mode, a new function registration mode, and an output device selection mode. In addition, the initial setting screen includes a control area for returning to the basic screen.

The finger print register screen includes two input areas for inputting a department code and an individual's name, respectively. As soon as the user inputs the department code and individual's name, the input data are displayed in their respective input areas.

The foregoing screens switches as shown by the diagram of FIG. 10. To begin with, the liquid crystal display device 1 displays the basic screen, and as soon as the user presses one of the function set area, image-quality set area, post-processing operation set area, and initial set area, the basic screen switches to the screen corresponding to the pressed area. For example, if the user presses the function set area, the basic screen switches to the first function setting screen. Further, if the user presses the set area for the next page, the first function setting screen switches to the second function setting screen (NEXT FUNCTION SETTING SCREEN).

On the other hand, if the operator presses the control area for returning to the basic screen, the first function setting screen returns to the basic screen. If the operator presses the italic function setting area and inverse function setting area on the first function setting screen, both the italic function setting area and inverse function setting area are displayed with a reversed background as shown in FIG. 11(*a*), and the first function setting screen switches to the one illustrated in FIG. 11(*b*). When the operator presses an execute key 112*a* on the screen of FIG. 11(*b*), the screen of FIG. 11(*b*) switches to the italic setting screen illustrated in FIG. 11(*c*). The italic setting screen includes a tilting angle input key 106*a* as a tiling angle setting area, and a setting end key 106*b* as a setting end input area. Further, the italic setting screen displays an example capital letter A tilted by the set angle.

Note that, as soon as the operator presses any function setting area in the first and second function setting screens, the screen switches to a corresponding parameter setting screen, such as the above italic setting screen.

Here, example image edit functions available in the present image forming system by manipulating the setting areas as explained above and the effect of each are set forth in Table 1 below. Note that, however, the image edit functions are not limited to the examples specified below, and a function for making fair copies of handwritten characters and/or pictures is also a possible option.

TABLE 1

| IMAGE EDIT FUNCTION | OPERATION |
| --- | --- |
| INDEPENDENT MAGNIFICATION | SET MAGNIFICATION IN LATERAL AND LONGITUDINAL DIRECTION INDEPENDENTLY |
| SHARPNESS | ADJUST IMAGE QUALITY OF A COPY |
| BINDING MARGIN | LEAVE AN ARBITRARY BINDING MARGIN |
| FRAME ELIMINATION | ELIMINATE FRAME IN A COPY |
| CENTERING | BALANCING A COPY AT THE CENTER |
| 1-SET-2-COPY | MAKE A COPY OF A BOOK |
| ADDRESSED COPY | ATTACH AN ADDRESS TO A COPY |
| MULTI-SHOT | COMBINE MULTI-PAGES IN ONE COPY |
| TRIMMING | COPY A DESIGNATED AREA ALONE |
| MASKING | LEAVE OUT A DESIGNATED AREA |
| MOVE | MOVE AN ORIGINAL DOCUMENT TO AN ARBITRARY POSITION |
| COMPOSITION | COMPOSITE MORE THAN ONE PAGE OF A COPY |
| MONOCHROME INVERSE | INVERSE NEGATIVE/POSITIVE |
| NET | IMPOSE A NET |
| SHADOW | ADD SHADOW |
| OUTLINE | BORDER AN IMAGE |
| ITALIC | TILT AN IMAGE |
| MIRROR IMAGE | REVERSE AN IMAGE AS A MIRROR DOES |
| REPEAT COPY | MAKE MULTI-COPY OF AN IMAGE IN ONE PAGE |
| 2-IN-1-COPY | MAKE ONE COPY IN EVERY TWO ORIGINAL DOCUMENTS |
| DATED COPY | ATTACH THE DATE TO A COPY |
| CENTER MARK | ATTACH A CENTER MARK TO A COPY |
| ENLARGE/DIVIDE OUTPUT | DIVIDE AN ENLARGED COPY INTO A NUMBER OF SHEETS |
| TRANSLATION | TRANSLATE AN ORIGINAL DOCUMENT |
| HIGH-GRADE IMAGE | MAKE A HIGH-GRADE IMAGE |

As shown, for example, in FIG. 12, the image forming system of the present embodiment includes three digital copying machines 91 through 93 as image forming apparatuses to be installed in office, a scanner 94, a printer 95 as an image forming apparatus, and a large-size host computer 96 as an image forming apparatus installed in a service center outside the office. The service center provides various kinds of data service including high-quality image processing.

The digital copying machine 91 is an inexpensive, low-grade, "memoryless" model furnished with basic edit functions only. "Memoryless" referred herein means that the machine does not include a page memory capable of storing a great volume of image data, but at least a line memory sufficiently large enough to operate as a normal digital copying machine. Also, the basic edit functions means, for example, the monochrome inverse function, that can be carried out without using a page memory. The digital copying machine 91 includes the scanner unit 40 of FIG. 2 with the resolution of 400 DPI (Dot Per Inch) in monochrome. The digital copying machine 91 has a relatively low operating rate of 20 CPM (20 copies Per Minute). The laser printer section 32 of the digital copying machine 91 has also a resolution of 400 DPI in monochrome, and includes an interface (I/F) 91*a*.

The digital copying machine 92 serving as second image forming apparatus is a middle class model with its scanner's and printer's resolutions at 400 DPI in monochrome, respectively, and an operating rate of 40 CPM. The digital copying machine 92 includes various kinds of edit functions, a page memory, and an interface 92*a*. The various edit functions include a "synthesis" function, a "repeat" function, etc., in addition to basic edit functions. The page memory is a 64 M-byte memory (capable of storing up to four Japanese Standard A4 size papers at the resolution of 400 DPI and 8-bit/pixel). The above memory corresponds to the main memory 73*a* of FIG. 4.

The digital copying machine 93 serving as second image forming apparatus is a high-grade model with its scanner's and printer's resolution at 400 DPI in monochrome, respectively and an operating rate as high as 60 CPM. Further, the digital copying machine 93 has various kinds of edit functions, a character recognition function, a bit data coding function, and a page memory of a capacity as large as 500 M byte (capable of storing up to 100 pages of Japanese standard A4 size papers at the resolution of 400 DPI and 8-bit/pixel and compression ratio of 1/4). Thus, the digital copying machine 93 can change the page order of the input image data, or store the document data in many different formats in addition to the edit functions of the digital copying machine 92. The above memory corresponds to the main memory 73*a* and hard disk 73*b* of FIG. 4 in combination. The digital copying machine 93 also includes an interface 93*a*.

The interfaces 91*a* through 95*a* are ethernets, which is in effect a network enabling high-speed image data transmission. Further, the interfaces 91*a*–95*a* are SCSI (Small Computer System Interface) or RS-232C enabling data transmission at moderate rates.

The scanner 94 can read a color image at a resolution of 600 DPI. The printer 95 can produce a color image copy at a recording density of 600 DPI. The scanner 94 and the printer 95 include interfaces 94*a* and 95*a*, respectively.

According to the image forming system of the present embodiment, by selecting the digital copying machine 93 having the greatest variety of the image processing functions and the image memory of a largest capacity to be the main image forming apparatus, the effective use of the variety of the image processing function and the memory of a large capacity is enabled from the sub image forming apparatus such as the digital copying machine 91 connected via the communication device.

Figure 13:
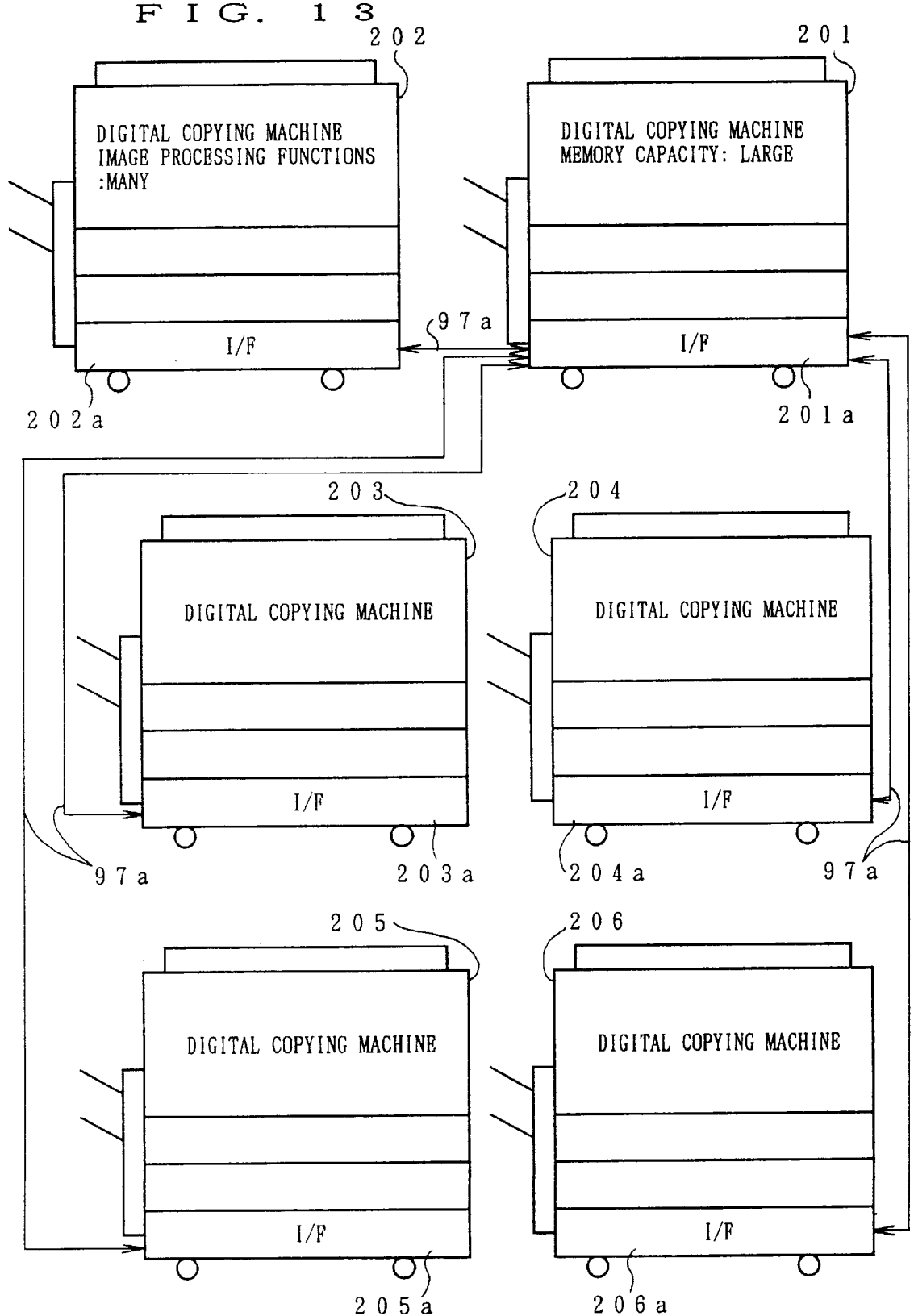
FIG. 13 is an explanatory view showing another schematic structure of the image forming system.

However, the image forming system of the present embodiment is not limited to the above arrangement. For example, as shown in FIG. 13, it may be arranged so as to include six digital copying machines 201 through 206 which are connected by mean of communication devices such as interfaces 201a through 206a, etc.

In this image forming system, the digital copying machine 201 having the memory 73 of the largest capacity and the digital copying machine 202 having the greatest variety of the image processing function are used in combination as the main image forming apparatus.

The digital copying machine 201 and the digital copying machine 202 are interconnected via the interfaces 201a and 202a and the communication line 97a to allow communications between them, and the digital copying machines 203 through 206 are connected via the interfaces 201a, and 203a through 206a and the communication line 97a. The digital copying machines 202 through 206 can communicate with other digital copying machines than the digital copying machine 201 via the digital copying machine 201.

In this image forming system, the described operations can be formed with ease by a combined use of the digital copying machine 201 and the digital copying machine 202. For example, the function of the digital copying machine 202 corresponds to the digital copying machine 93 shown in FIG. 12, and the digital copying machine 201 has a smaller variety of image processing functions than the digital copying machine 93. The functions of the digital copying machines 205 and 206 correspond to the function of the digital copying machine 91.

The digital copying machines 201 and 202 which constitute the main image forming apparatus have respective functions, i.e., the digital copying machine 201 mainly does the control of the image data which requires the memory 73 of a large capacity, and the digital copying machine 202 does the processing of the image.

After the image data as processed are stored in the memory 73 of the digital copying machine 201, the image data are sent back to the digital copying machine 203 from the digital copying machine 201. The described control operation is performed, for example, by the PCU 74 of the digital copying machine 201.

As described, for example, by adopting a plurality of digital copying machines to allocate thereto respective functions to constitute the digital copying machine, compared with the case of adopting one digital copying machine as the main image forming apparatus which requires high-quality function, the manufacturing cost can be reduced, and an improved efficiency of the image forming system can be achieved.

The image forming system of the present embodiment may be arranged as follows.

Figure 14:
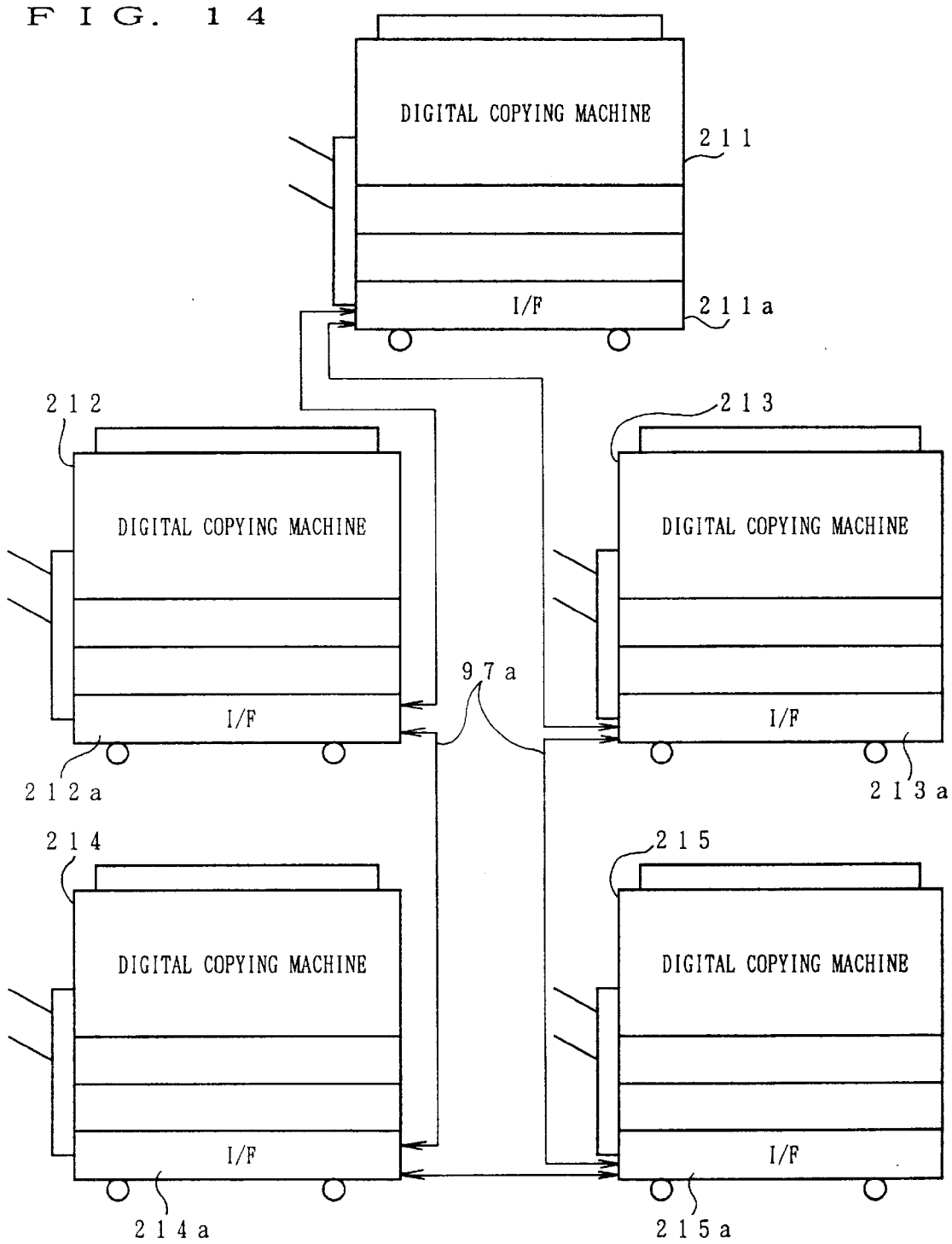
FIG. 14 is an explanatory view showing still another schematic structure of the image forming system.

According to the system having the structure shown in FIG. 14, for example, five digital copying machines 211 through 215 are provided, and the digital copying machines 211 through 215 respectively include interfaces 211a through 215a to allow communication among them. These digital copying machines 211–215 are connected to respective interfaces 211a–215a and the communication line 99 so as to constitute the network of a loop shape. Here, each of the digital copying machines 211–215 corresponds, for example, to the digital copying machine 30.

In the present image forming system, if any of the digital copying machines 211 through 215 the operator is manipulating does not have a desired image processing function, the manipulated digital copying machine issues a job request to the other digital copying machines to carry out that particular function on its behalf. To realize above arrangement, each of the digital copying machines 211 through 215 withholds data as to the image processing functions and memory capacities of the other digital copying machines. The job request can be issued either automatically or manually. In case that the job request is issued manually, the digital copying machines that have the desired function are displayed on the liquid crystal display device 1, and the operator selects the digital copying machine from those displayed on the screen.

In FIG. 12, the host computer 96 includes a high-speed data processing CPU, a high-speed editing algorithm, a high-speed data recognizing algorithm, a memory with a capacity far larger than the memory 73, various kinds of databases for recognizing paper money or the like, and an interface 99a.

The digital copying machine 93 and the host computer 96 are interconnected to each other through their respective interfaces 93a and 99a and a telephone line 97. Note that the telephone line 97 may be replaced with any other adequate communication line 97a, such as optical fibers. Two general ISDN (Integrated Services Digital Network)-capable modems (modulator) 98 are provided to the digital copying machine 93 and host computer 99, respectively. Each modem 98 converts a digitalized electric signal into a signal which can be transmitted through the telephone line 97. Each modem 98 adopts the PM (Phase Modulation) method, AM (Amplitude Modulation) method, FM (Frequency Modulation) method, or the like. Herein, the interfaces 91a through 95a and 99a, communication line 97a, telephone line 97, two modems 98 constitute the transmitting apparatus. The kinds of data this device can handle are previously explained.

The digital copying machines 91 through 93 and host computer 96 can transmit various kinds of data, such as control command codes and bit data represented by image contrast data, through the communication line 99. The digital copying machines 91 through 93 respectively have a fax function which permits commutation of the data by the communication line 99 and a printer mode for printing out the document data from a personal computer, word processor, etc.

For convenience in explanations, a single office is connected to the service center in FIG. 12; however, many number of operators' offices throughout the nation are connected to the service center in practice.

The functions of the digital copying machine depends on its price, memory capacity, and the like, and every office has different purpose and demand. Thus, the digital copying machines are not limited to the above example digital copying machines 91 through 93, and a great line-up of models are available.

Also, the host computer 96 is provided with a high-grade image processing functions including image edit functions and high-speed image processing. Therefore, the host computer 96 includes at least the functions provided to ordinary digital copying machine. However, the host computer 96 may omit basic functions provided to an inexpensive model. In short, the host computer 96 includes optimal functions in consideration of the functions which the service center provides.

The image forming system of the present invention permits a copying operation to be performed using a memory of a large capacity installed in the host computer 96. It is also permitted to perform a copying operation using an external memory such as a memory installed in other copying machines than the one being used.

Incidentally, the image processing functions have been steadily developed to meet the demand of constructing infrastructure or improvement in work efficiency in the information society. Thus, the newest image processing functions can be added to the digital copying machine which newly enters into the market, or the old image processing functions which have become less valuable are replaced with the new image processing functions.

Here, example image edit functions provided to the digital copying machines 91 through 93 and host computer 96 are set forth in Table 2 below.

machines 91 through 93, while the host computer 96 has the image processing functions in the highest level. Thus, if the user wishes to use an image processing function which is not installed in any of the digital copying machines 91 through 93 in the office, or he can not use a desired image editing function because the capacity of the memory 73 in any of the digital copying machines 91 through 93 in the office is short, the image data are transferred from the office side to the service center side and processed in an adequate manner. Then, the processed image data are returned to the office side, so that an image done with the desired image processing can be output on a sheet in the office side.

The image processing operation of the image forming system arranged as above will be detailed with reference to the flowchart of FIG. 15. Assume that in the digital copying machine 91, the operator selects the sharpness function to

TABLE 2

| IMAGE EDIT FUNCTION | COPYING MACHINE 91 | COPYING MACHINE 92 | COPYING MACHINE 93 | HOST COMPUTER |
|---|---|---|---|---|
| INDEPENDENT MAGNIFICATION | o | o | o | o |
| SHARPNESS |   | o | o | o |
| BINDING MARGIN | o | o | o | o |
| FRAME ELIMINATION | o | o | o | o |
| CENTERING |   | o | o | o |
| 1-SET-2-COPY |   | o | o | o |
| ADDRESSED COPY |   |   | o | o |
| MULTI-SHOT |   | o | o | o |
| TRIMMING · MASKING |   | o | o | o |
| MOVING FUNCTION |   | o | o | o |
| COMPOSITION FUNCTION |   |   | o | o |
| MONOCHRONE INVERSION/NETTING | o | o | o | o |
| SHADOW/OUTLINE |   |   | o | o |
| ITALIC/MIRROR IMAGE |   |   | o | o |
| REPEAT COPY | o | o | o | o |
| 2-IN-1-COPY |   |   | o | o |
| DATE/CENTER MARK |   |   | o | o |
| ENLARGED & DIVIDED OUTPUT |   |   |   | o |
| TRANSLATION |   |   |   | o |
| HIGH GRADE QUALITY |   |   |   | o |
| MAGNIFICATION CONVERSION | o | o | o | o |
| ROTATION |   |   | o | o |

The basic operation of the present image forming system arranged as above will be explained in the first place. As previously mentioned, the digital copying machines 91 through 93 in the office and the host computer 96 in the service center can mutually transmit the data through the telephone line 97. Thus, a digital signal transmitted from any of the digital copying machines 91 through 93 is modulated by the modem 98 in the digital copying machine 93 side and sent to the host computer 96 side through the telephone line 97, after which the modulated signal is de-modulated by the modem 98 in the host computer 96 side and entered into the host computer 96. The content of the digital signal include the control command codes and bit data like the image contrast data. Thus, the host computer 96 analyzes the content of the control command codes and starts the image processing using the specified image editing function(s) for the subject image data. The image data processed by the host computer 96 are returned to the digital copying machine 93 in the manner reversed to the previous inbound transmission, and output onto a sheet as an image by the digital copying machine 93, for example.

As set forth in Table 2 above, the level of the image editing functions is higher in order of the digital copying highlight an image in every certain number of pages, and the image data are distributed to the digital copying machines 92 and 93 to be processed. Here, in the digital copying machines 91 and 92, on the function setting screen of the liquid crystal display apparatus 1, the functions provided in the digital copying machine 93 are displayed.

Figure 16:
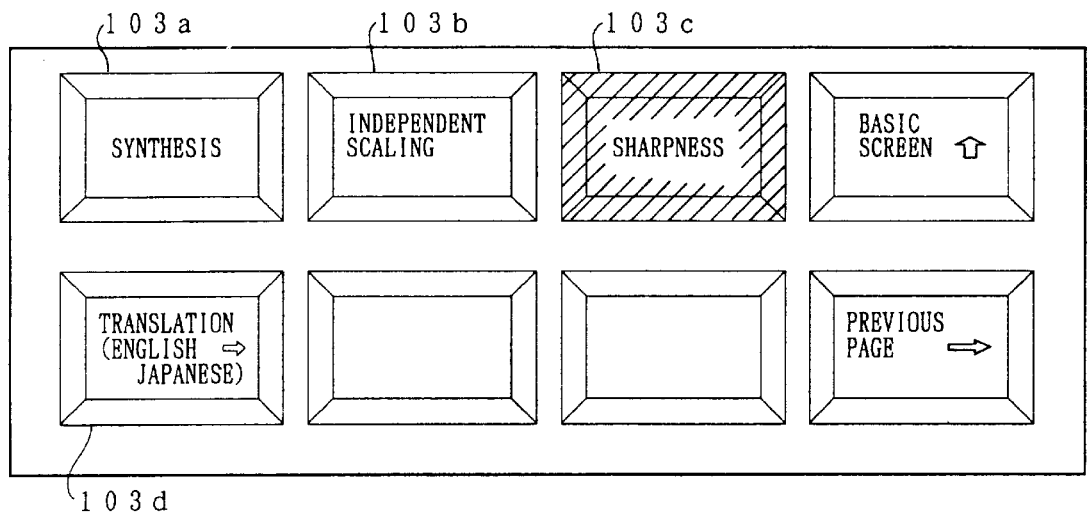
FIG. 16(a) shows a state of selecting an image editing function in the second function setting screen shown in FIG. 6(c)
FIG. 16(b) is an explanatory view showing a display state of a liquid crystal display apparatus which is not provided with an image editing function.
FIG. 16(c) shows a screen for setting a "sharpness" function.
Figure 16:
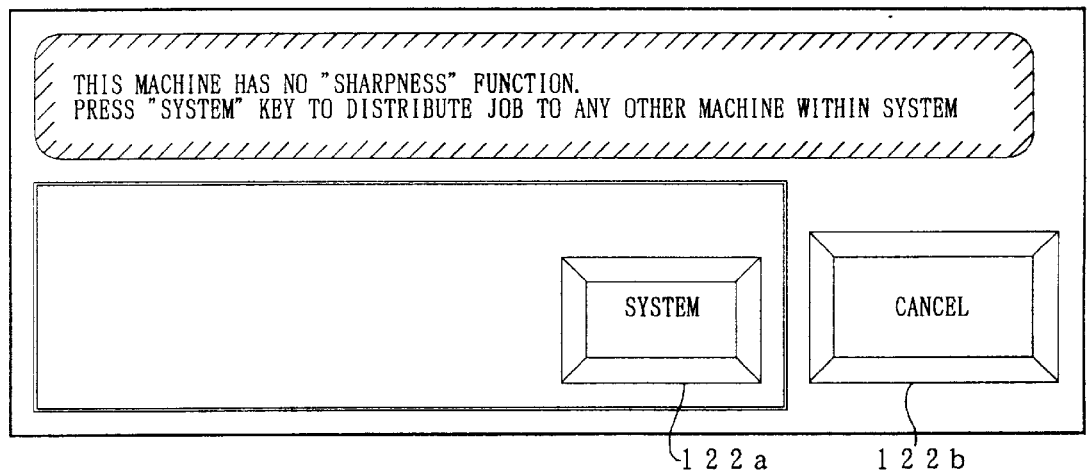
Figure 16:
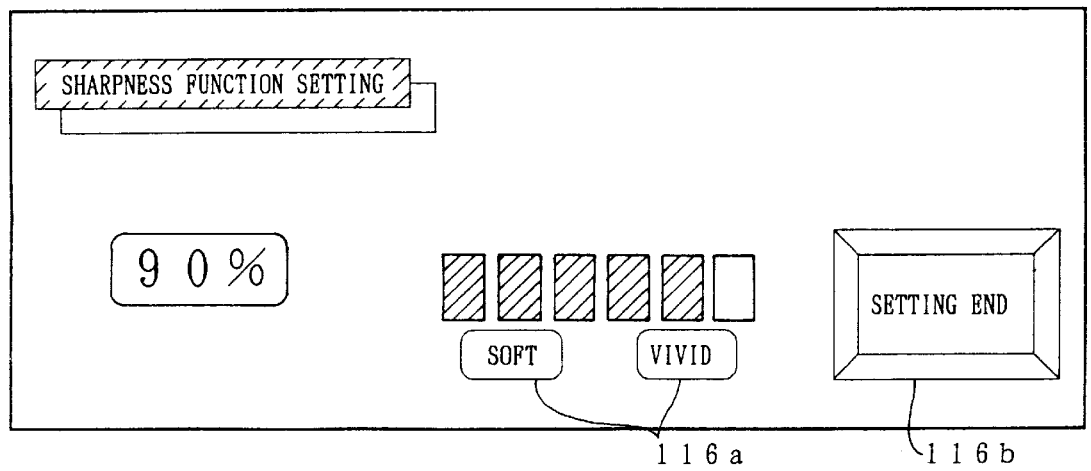

As soon as the operator presses the function setting key 101*a* in the basic screen on the liquid crystal display apparatus 1 of FIG. 6(*a*), the screen switches to the first function setting screen of FIG. 6(*b*). Then, the screen switches to the second function setting screen of FIG. 6(*c*) when the operator presses the next page key 102*h*. To select the sharpness function, the operator presses the sharpness setting key 103*c* in the second function setting screen (S1), the sharpness setting key 103*c* is displayed with an inverse background as shown in FIG. 16(*a*), which enables the operator to confirm that he has selected the sharpness function.

Next, the PCU 74 of the digital copying machine 91 determines whether nor not the sharpness function is provided in each digital copying machine as well as the image processing abilities of the respective digital copying machines 91, 92 and 93 (S2).

Next, the PCU 74 determines if the sharpness function is provided in the digital copying machine 91 being used (S3). As set forth in Table 2 above, the digital copying machine 91 does not have the sharpness function. Thus, the checking result is negative in S3. Accordingly, a message "THIS MACHINE HAS NO SHARPNESS FUNCTION" is displayed on the basic screen of the liquid crystal display apparatus 1 as shown in FIG. 16(*b*), and directs the operator to select whether the image data should be processed by an external machine in the system or not (S4).

As described, since the digital copying machine 91 does not have the sharpness function, if the operator wishes to execute the sharpness function, he has to request other machines to carry out the sharpness function. However, if the operator does not wish so, he presses a cancel key 122*b*, upon which the CPU 74 determines that the operator does not wish to request the other machines to carry out the sharpness function (S5). Then, the set mode is cancelled (S6). On the other hand, when the operator presses the system selection key 122*a* on the display screen, the PCU 74 determines that the external machine performs the sharpness function (S5). Then, the PCU 74 selects the digital copying machines 92 and 93 as the ones having the sharpness function within the system. Also, the screen on the liquid crystal display apparatus 1 shifts to the sharpness function setting screen of FIG. 16(*c*).

Next, the operator inputs the desired highlighting level in sharpness using a sharpness input key 116*a* on the display screen. Upon completing the setting, the setting end key 116*b* is pressed upon which the PCU 74 of the digital copying machine 91 determines the digital copying machine to which a request for processing an image of each document data is to be given (S7). Next, the PCU 74 transmits the processed image data to the digital copying machines 92 and 93 after scrambling the image data (to be described later) (S8).

The above image data are transmitted from the main memory 73*a* of FIG. 4 to the digital copying machines 92 and 93 through an image data communication unit 81 and a modem (not shown). The image data are transmitted together with the function control data composed of a processing code indicating the requested function, namely, the sharpness function herein. As shown in FIG. 12, the transmitted image data are distributed to the digital copying machines 92 and 93 through the interface 91*a*, communication line 99, and interface 92*a* and 93*a*.

The image data processed herein are the data of the original image read by, for example, the scanner section 31. As previously mentioned, it is not the page memory but the line memory that the digital copying machine 91 includes. Therefore, the image data are read line by line and transferred steadily line by line.

In case that the image data are transferred through a general network, the image data may leak to an external to the network. Thus, if the original image contain confidential information, it is strongly recommended to transmit the image data thereof with great care to prevent the leakage.

Namely, since anyone can access the general network at any time, an authorized third party can easily obtain the data flowing through the network, which is known as a crime by a hacker. Therefore, it is preferable to have a preventive measure, such as scrambling the data subject to transmission through the network, so that should the third party obtain the data, he can not make any sense out of them. In the present embodiment, the transmission data are scrambled for the security reason.

Upon receipt of the scrambled image data, the digital copying machines 92 and 93 descramble the image data, and confirm the same as being the image data and function control data. Then, the digital copying machines 92 and 93 start to process the received image data using the sharpness function as requested (S9).

The digital copying machines 91 through 93, scanner 94, and printer 95 are interconnected through their interfaces 91*a* through 95*a* and the communication line 99, thereby enabling bi-directional data transmission. Thus, the interfaces 91*a* through 95*a*, the communication line 99, and the PCU 74 constitute the transmitting apparatus.

Namely, the digital copying machine 91 which gives a request for processing an image may not have a sufficient memory capacity for storing image data as transmitted from respective digital copying machines 92 and 93.

Therefore, in the present embodiment, it is arranged such that when outputting the image by the laser printer section 32 of the digital copying machine 91, the image data as processed by the digital copying machine 92 or 93 are sent back to the digital copying machine 91 not immediately after the completion of the image process, but when the digital copying machine 91 is to output the image after determining if a request for returning the image data is given (S10).

Upon receiving the request for returning the image from the digital copying machine 91, in the digital copying machine 92 or 93, the data are scrambled again, and the data as scrambled are sent back to the digital copying machine 91 of the transmitting end of the image data along a path different from the path previously used (S11).

In the digital copying machine 91, the scrambling process of the data as received are cancelled (S12). The processed image data after the scrambling process has been cancelled are temporarily stored in the image memory page by page. Thereafter, after having gone through the described sequential other process, the image data are output as serial image data from a laser printer, and are output as an image on the sheet (S13). In this case, a recording operation is as explained in the digital copying machine 30.

Figure 17:
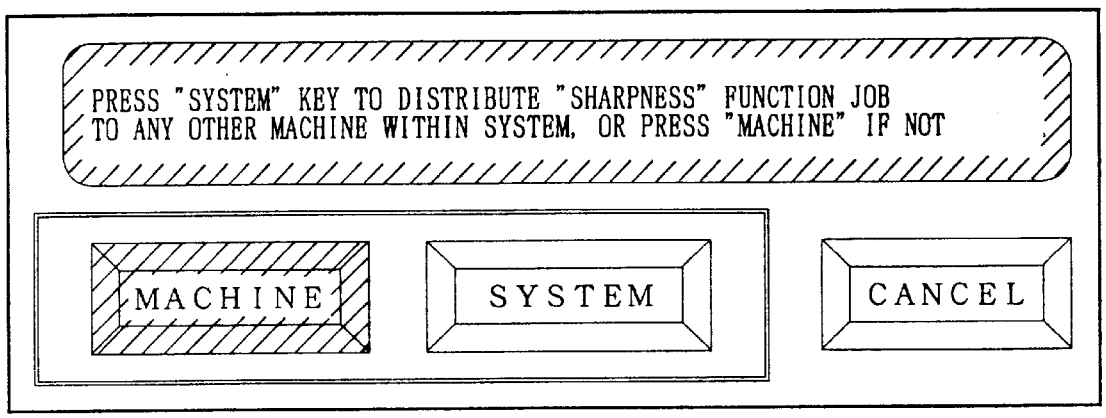
FIG. 17 is a front view showing a display state of a liquid crystal display device when confirming if the process is to be distributed using the operational panel.

On the other hand, if the result of determination in S3 is YES, i.e., if the digital copying machine being used is provided with the sharpness function, as shown in FIG. 17, a message "THIS MACHINE HAS SHARPNESS FUNCTION." is displayed in the liquid crystal display device 1, and in the meantime the operation is asked to select if the digital copying machine 93 in the system other than the copying machine is to be used (S1).

For example, assumed here that the copying machine being used is the digital copying machine 92, and a "sharpness" process is performed using the image data processing section 71 of the digital copying machine 93.

Here, the PCU 74 determines if the "sharpness" function is determined in the system (S15), and in the case where the "sharpness" function is performed using the system (the digital copying machine 93 in this case), the document image is transferred to the digital copying machine 93 in S7, and the image data as processed by the digital copying machine 93 are output from the laser printer section 32. On the other hand, in the case where the "sharpness" function is performed only in the copying machine being used (S16), a sequence goes back to 513 to output the image.

As described, according to the image forming system of the present embodiment, upon selecting the image editing function which is not provided in the digital copying machine 91, the image editing operation as requested may be distributed to the digital copying machines 92 and 93.

Therefore, it is not necessarily that the digital copying machine 91 is provided with the image editing functions as high grade as those of the digital copying machines 92 and 93.

Figure 15:
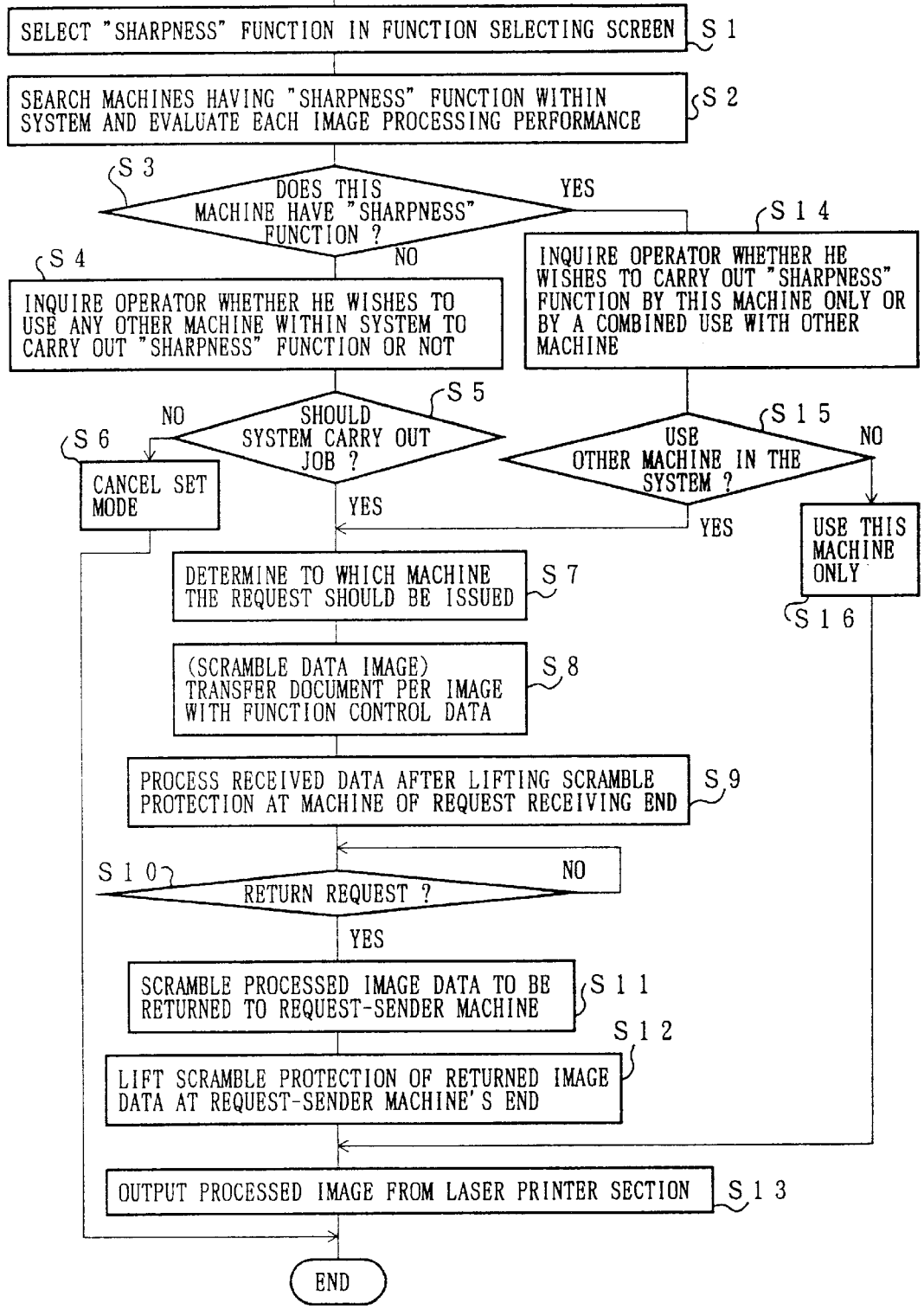
FIG. 15 is a flowchart showing an example of an image processing operation of the image forming system.

In an example shown in FIG. 15, in S11, the image data as processed by the digital copying machines 92 and 93 are sent back to the digital copying machine 91 of the requesting end, and the image is output by the digital copying machine 91, and the image is output by the digital copying machine 91. However, it may be also arranged such that the receiving end of the processed image data is selected according to various conditions, and the digital copying machine as selected may output the image by the printer.

In the above explanation, only the digital copying machines 91 through 93 are concerned. However, if the scanner 94 and printer 95 are combined, they can operate in almost in the same manner. In this case, color image data read by the scanner 94 with a resolution of 600 DPI are sent to the digital copying machine 93 to be processed. Then, the digital copying machine 93 returns the processed image data with a recording resolution of 600 DPI to the printer 95 to be printed out therefrom. Thus, the scanner 94 and printer 95, when combined, can operate almost in the same manner as the above digital copying machines.

The present image forming system is arranged in such a manner that the digital copying machines 91 and/or 92 can use the memory 73 of the digital copying machine 93, which will be explained using example transmission where the digital copying machine 92, serving as the first image forming apparatus that issues a job request, and the digital copying machine 93, serving as the second image forming apparatus that receives the job request. Herein, the digital copying machine 92 includes the electronic RDH function. By the electronic RDH function, all the image data of a 10-page original document are stored in the memory 73, and retrieved repetitively per page to make, for example, 20 copies. The operator can select the electronic RDH function by pressing the function set key 101a of FIG. 6(a). As soon as the function set key 101a is pressed, an electronic RDH function setting key is displayed on the second function setting screen of FIG. 6(c).

Figure 18:
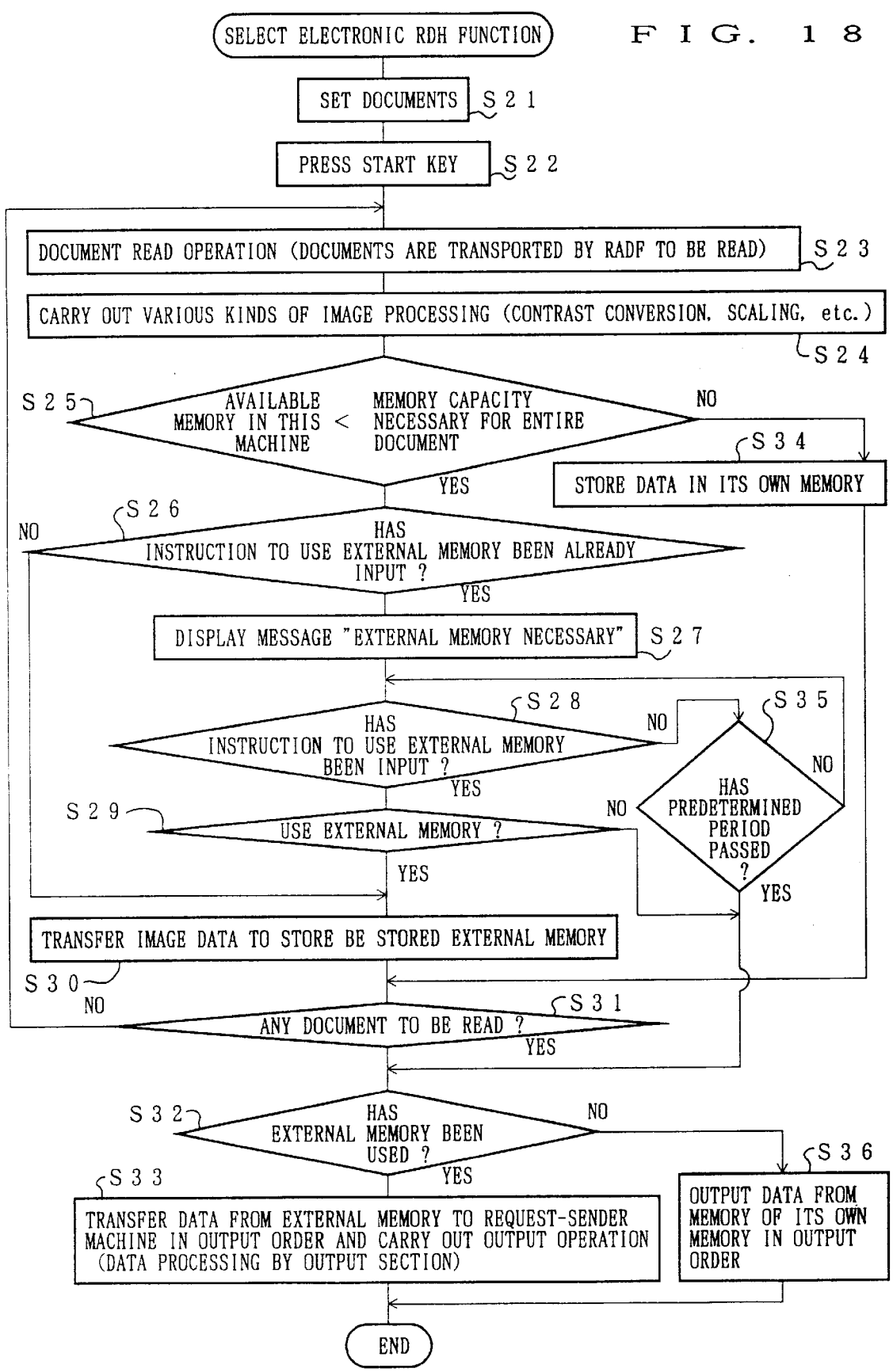
FIG. 18 is a flowchart showing another operation of the image forming system.

The digital copying machine 92 includes a 64 M-byte page memory as the memory 73. Thus, the memory 73 can store 256 gray shades image data of up to four Japanese Standard A4 size papers. This is sufficient for an ordinary copying operation where a copy of the original document is made after the image data thereof are stored. However, in case that the operator wishes to make several copies of a 10-page document using the electronic RDH function, the image data of 6 pages exceeds the capacity of the memory 73. Thus, in this case, the electronic RDH function is carried out using the memory 73 serving as the storage means of the digital copying machine 93, which will be explained with reference to the flowchart of FIG. 18.

To begin with, the operator selects the electronic RDH function in the digital copying machine 92, and sets a 10-page document on the RADF 36 of FIG. 2 (S21). Then, as soon as the operator presses the start key 15 of FIG. 5 (S22), the steady document transportation from the RADF 36 starts and an image on each page of the documents is successively read by the scanner unit 40. The image data thus produced are steadily accumulated in the memory 73 of the digital copying machine 92 (S23). Also, the above image data are subject to processing by the image data processing section 71, such as the contrast conversion and scaling (S24). When the operator presses the electronic RDH function set key, an external memory selection key 121a is displayed on the liquid crystal display device 1 together with an available memory indicating section 121b as shown in FIG. 19(a).

While the scanner unit 40 is reading the document, if an available capacity of the memory 73 becomes insufficient to store the image data of the rest of the document (S25), and if the operator has not pressed the external memory selection key 121a in advance (S26), the liquid crystal display device 1 displays a message warning that an external memory is necessary as is shown in FIG. 19(a) (S27).

As soon as the operator presses the external memory selection key 121a (S28), the screen switches to the one displaying a message as shown in FIG. 19(b).

On the switched screen, the external memory selection key 121a is displayed with a reversed background to indicate that the same has been pressed, while the available memory indicating section 121b indicates a total of the available capacities of the memories 73 in both the digital copying machines 92 and 93.

According to the message shown in FIG. 19(b), upon depressing an execution key 12c by the user (S29), in order to use the memory 73 of the digital copying machine 93 as an external memory, the image data are transferred to the digital copying machine 93 (S30).

Then, the screen of the liquid crystal display device 1 switches to the one shown in FIG. 19(c). Note that the image data transferred to the digital copying machine 93 are either the image data being read by the scanner unit 40 or the image data stored in the memory 73 of the digital copying machine 92. Also, the image data are transferred in the same manner as directly sending the image data explained above. Accordingly, the digital copying machine 93 receives the transferred image data and stores the same in its own memory 73.

The digital copying machine 92 carries out S23–S30 repetitively until the entire document is read (S31). When the document reading ends, and in case that the external memory is used (S32), the digital copying machine 93 returns the image data to the digital copying machine 92 in the output order, so that the digital copying machine 92 can steadily output the returned image data in the form of an image on a sheet (S33). Herein, the output order is a descending order in page numbers.

The image data are retrieved from each memory 73 in the same manner as the writing operation. To be more specific, the image data are retrieved from the memory 73 of the digital copying machine 92 through a data line within the digital copying machine 92, whereas the image data are retrieved from the memory 73 of the digital copying machine 93 through the communication line 97a.

On the other hand, if an available capacity of the memory 73 of the digital copying machine 92 is sufficient to store the image data of the rest of the document in S25, the digital copying machine 92 continues to store the image data into its own memory 73 (S34), and proceeds to S31. Subsequently, the digital copying machine 92 carries out S31 and S32, and steadily outputs the image data stored in its own memory 73 onto a sheet in an output order (S36).

When a predetermined time limit has passed before the operator presses the external memory selection key 121a in S28 (S35), the digital copying machine 92 proceeds to S32 and steadily outputs the image data stored in its own memory 73 up to that point onto a sheet in an output order (S36).

In the above explanation, the digital copying machine 92 is arranged to store the image data into its own memory 73 to its full capacity; however, some pages of which may be secured as an operation area used exclusively for its control operation.

An image forming system of the present invention is arranged such that a copying machine can inhibit the image recording operation of the copy-prohibited image even the copying machine is not furnished with a determining section for determining the copying of the subject image data is prohibited or not. In other words, the digital printing technique, such as electrophotographic technique, has been steadily progressing, and the technique for inhibiting the copying should be advanced at the same pace. However, the latest technique would be worthless unless the same can be applied to the old models as well. To solve the above problem, the user can always use the latest technique at the minimum investment in the present image forming system. A copy-inhibited image referred to as the specimen image means an image related to money, such as paper money and gift certificates, and marketable securities, for which the copying is prohibited by law, or confidential documents, copy-prohibited documents under specific rules, etc.

As shown in FIG. 4, the digital copying machine 93 serving as both the image forming apparatus and image processing apparatus in the present image forming system includes the PCU 74 serving as a specimen image determining section. The PCU 74 is furnished with a function of determining if an image as input from the image data input portion 70 is a copy-prohibited image or not based on the pre-recorded data in the ROM (Read Only Memory) including the memory 73.

More specifically, the PCU 74 determines if the input image is a copy-prohibited image or not by comparing the same with the pre-registered data of various copy-prohibited specimen images. In other words, the determination is made based on whether the input image and any of the specimen images have the same value. Optionally, the PCU 74 may make a determination under a unique rule to the user, such as determining the input image as being the copy-prohibited image whenever an image has "confidential" in red at the upper right corner.

In addition, besides either the negative or positive determination, a gray determination may be possible. The gray determination referred herein means that the copying is highly likely to be prohibited. This kind of determination is used when the input image data do not coincide with the specimen image data precisely, but are very close.

Further, the digital copying machine 93 pre-records the copy-prohibited specimen image data in the memory 73. However, the copy-prohibited specimen image data can be recorded into a mask ROM or the like when the digital copying machine 93 is delivered, or loaded down into the memory 73 from the other digital copying machines through the interface 93a serving as a transferring device.

Then, when the PCU 74 determines that the input image as being the copy-prohibited image, the PCU 74 indicates that the copying of the subject document is prohibited on the liquid crystal display device 1 on the control substrate 77.

If the input image is the copy-prohibited image with 100% accuracy, the above indication of being the copy-prohibited image can be displayed straightforward. However, there may be a case when the input image is highly likely to be the copy-prohibited image but whether the accuracy is 100% or not is dubious. In such a case, the image data processing portion 71 processes the input image, and outputs the processed image data to the image data output portion 72 with a lower image quality. The image quality is lowered to prevent a crime. More specifically, if a high-quality copy is made when the subject image is highly likely to be paper money, the user may use the copy illegally, but a copy with a lower quality can prevent such a crime beforehand. The image quality is lowered by lowering the resolution or making a monochrome color copy instead of a full-color copy.

The digital copying machines 92 and 93 also receive image information from another machine, for example, the digital copying machine 91, and determines if the subject image is the copy-prohibited image or not. The digital copying machine 93 returns the determination result to the request-sender digital copying machine 91 through the interfaces 92a, 93a and 91a.

Further, when a plurality of digital copying machines 92 and 93 are connected within the present image forming system, the determination can be made by any of the digital copying machines 92 and 93, or a second determination can be made by another digital copying machine 93 after the first determination is made by one of the digital copying machines 93.

A control operation of determining if the image to be processed is the copy-prohibited image or not will be detailed with reference to the flowchart of FIG. 20 and FIGS. 21(a), 21(b) and 21(c).

When the digital copying machine 91 which is not furnished with the specimen image determining section starts the copying operation in the present image forming system (S41), the digital copying machine 91 transmits the input image to the digital copying machine 93 which is furnished with the specimen image determining section in the present image forming system through the interfaces 91a and 93a together with a request for determining if the image to be processed is the copy-prohibited image or not (S42). The request-sender digital copying image 91 does not erase the subject image data and withholds the same in its own memory 73 until the determination result is returned.

Next, after a predetermined period has passed (S43) and if the determination result is returned within the predetermined period (S44), the request-sender digital copying machine 91 starts the control of the copying operation based on the determination result. More specifically, if the subject image can be copied (S45), the normal copying operation is carried out (S46). In other words, the image is printed out (S52).

On the other hand, if the copying of the subject image is prohibited, the digital copying machine 93 further determines if the copying of the subject image is prohibited completely or not (S47). If the copying of the subject image is prohibited completely, the digital copying machine 93 transmits the determination result to the digital copying machine 91 through the interfaces 93a and 91a. Accordingly, as shown in FIG. 21(a), the digital copying machine 91 displays a screen for cancelling the copying of the subject image on the liquid crystal display device 1 serving as a confirmation notifying section for the user and stops the copying operation (S48).

If the determination result is gray, that is, the subject image is highly likely to be the copy-prohibited image, the digital copying machine 91 checks whether there is any other copying machine having a higher determination level within the image forming system (S49). If there is such a copying machine having a higher determination level (S50), the digital copying machine 91 returns to S42 and issues a request for the determination on whether being the copy-prohibited image or not to the above copying machine.

Herein, the determination level of the specimen image determining section in each digital copying machine 93 is stored in the memory 73 of the digital copying machine 91, so that the PCU 74 can select the copying machine having a higher level specimen image determining section.

If there is no digital copying machine 93 having a higher determination level as shown in FIG. 21(b), the PCU 74 displays a screen indicating that the copying operation is carried out with a lower image quality, and after the user confirms the operation, the PCU 74 resumes the copying operation with a lower image quality (S51) and prints out an image (S52).

In the present embodiment, when the subject image appears to be a copy-prohibited image, the copying operation is carried out with a lower image quality. However, as shown in FIG. 21 (c), a screen may be displayed to indicate that the copying appears to be illegal, and ask whether the user still wishes to make a copy by taking the risk, so that the user can select either to carry out the copying normally or stop the copying.

On the other hand, in S44, the determination result may not be returned for a considerable time because the request-receiver machine is having a trouble, such as a power shut-down and network trouble.

To avoid the above problem, a predetermined period is set, and if the determination result is not returned within the predetermined period, the digital copying machine 91 resumes the operation without receiving the determination result on the assumption that the request-receiver machine is having a trouble (S53).

However, when the determination result is returned from the request-receiver machine before the operation starts (S54), the digital copying machine 91 immediately proceeds to S45 and resumes the operation based on the determination result.

The digital copying machine 91 resumes the operation without receiving the determination result from the request-receiver machine by resuming the copying operation with a lower image quality, or issuing a request to use another copying machine having the determination means, besides resuming the normal copying operation. If the digital copying machine 91 issues a request for the determination to another copying machine having the determining means and the copying of the subject image is determined to be allowable, the digital copying machine 91 prints out the image withheld from the start (S52).

Next, the determining operation of the digital copying machine 92 having a simple copy-prohibited image determination means will be explained with reference to the flowchart in FIG. 22.

Figure 20:
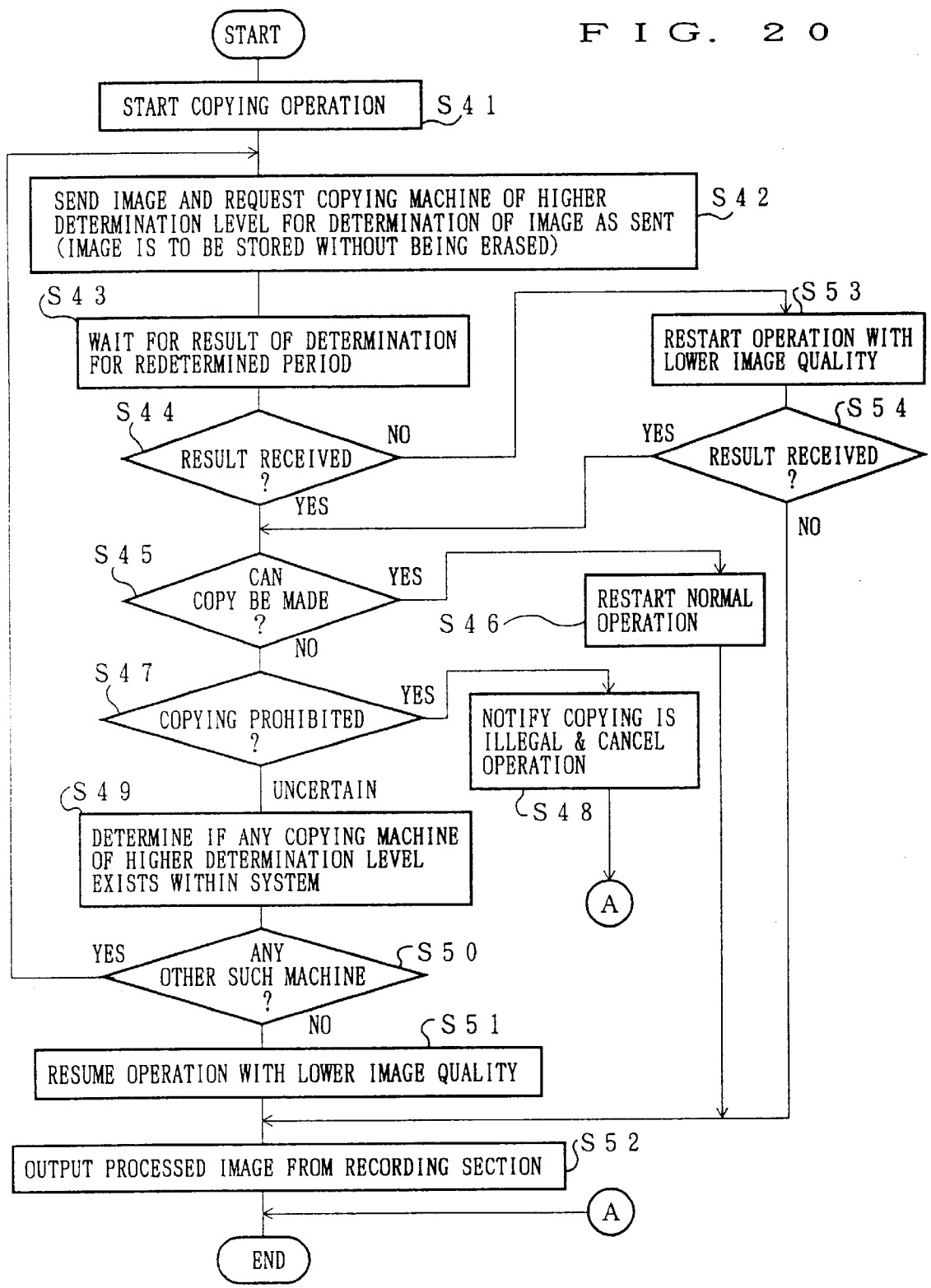
FIG. 20 is a flowchart showing still another operation of the image forming system.

The procedure herein basically is the same as the flowchart in FIG. 20, where the digital copying machine 91 having no specimen image determining section determines if the subject image is the copy-prohibited image or not. The difference is that the request-sender digital copying machine 92 has simple copy-prohibited specimen image determination means and that an image which obviously does not seem to be a copy-prohibited specimen image is determined by its own copy-prohibited specimen image determination means, so that the copying operation is completed without issuing a request for the determination to any other machine through the network. Therefore, providing simple image determination means is more advantageous than providing no image determination means in terms of processing speed.

Figure 22:
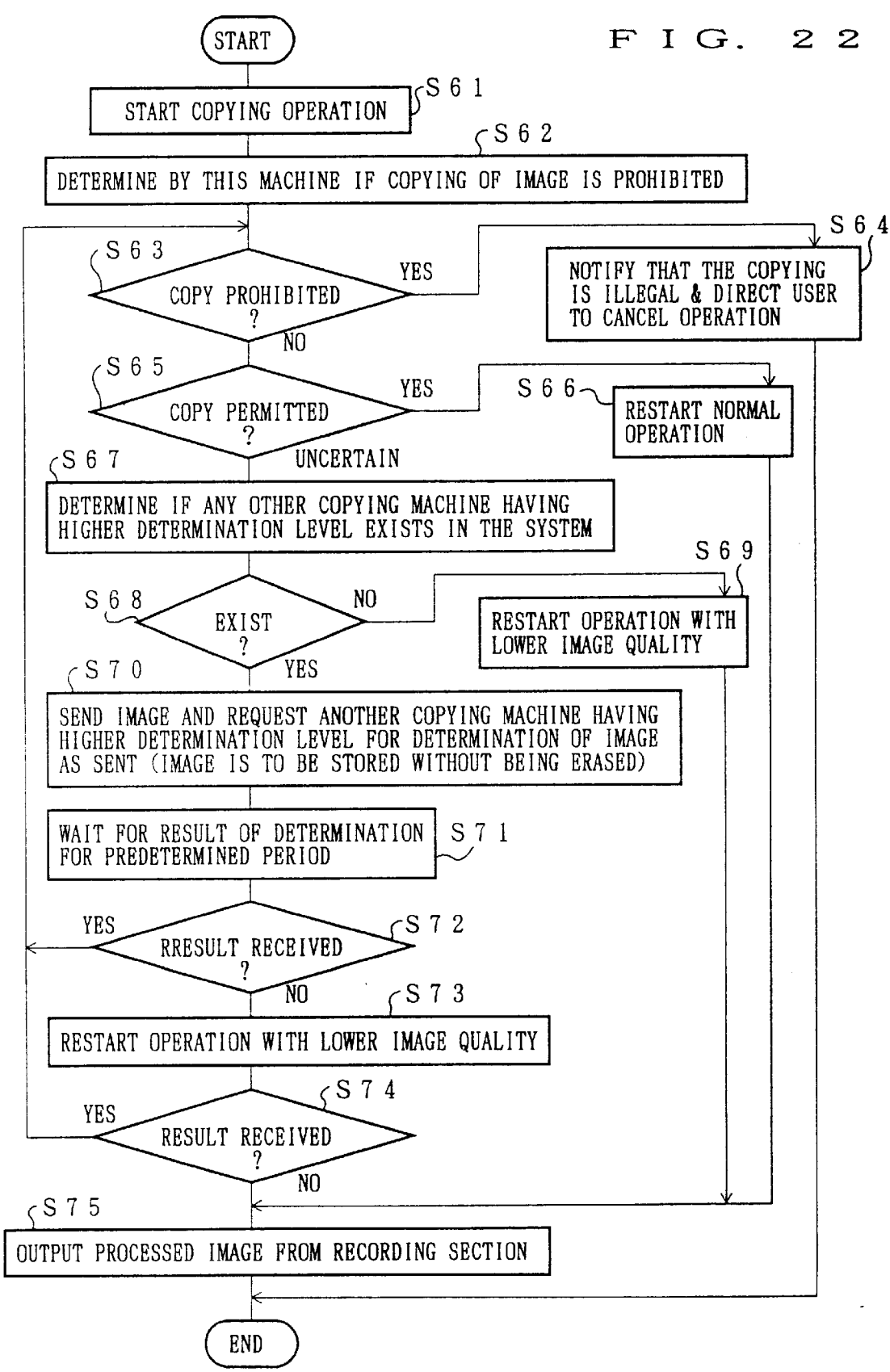
FIG. 22 is a flowchart showing still another operation of the image forming system.

More specifically, as shown in FIG. 22, when the digital copying machine 92 starts the copying operation (S61), the digital copying machine 92 determines if the input image is the copy-prohibited image or not using its own specimen image determining section (S62 and S63).

If the input image is the copy-prohibited image, the digital copying machine 92 stops the copying operation by indicating that the copying of the input image is illegal as explained with reference to FIGS. 21(a) through 21(c) (S64).

Otherwise, the digital copying machine 92 determines whether the input image can be copied or not (S65). If the determination result is positive, the digital copying machine 92 resumes the normal copying operation (S66), and prints out the subject image (S75).

If the input image can not be copied, the digital copying machine 92 further checks whether there is any other copying machine with a higher determination level within the image forming system (S67). If there is not such a copying machine within the system (S68), the digital copying machine 92 carries out the copying operation with a lower image quality (S69 and S75).

If there is a copying machine with a higher determination level, for example, the digital copying machine 93 having the high-level specimen image determining section, the image copying machine 92 transmits the input image through the interfaces 92a and 93a with a request for the determination on whether the subject image is the copy-prohibited image or not (S70).

Then, the digital copying machine 92 waits for the determination result from the request-receiver digital copying machine 93 for a predetermined period (S71), and upon receipt of the determination result (S72), the digital copying machine 92 returns to S63 and start to control the copying operation again based on the determination result.

On the other hand, if the digital copying machine 92 does not receive the result of determination within the predetermined period, the digital copying machine 92 resumes the copying operation with a lower image quality (S73 and S75). If the digital copying machine 92 receives the determination result from the request receiver digital copying machine 93 after it has resumed the copying operation and before it has completed the printout operation of the image (S74), the digital copying machine 92 returns to S63 as previously mentioned to carry out the operation again from the start based on the determination result.

As has been explained, in case of either FIG. 20 or FIG. 22, the request for the determination is issued to a copying machine having a higher determination level than the request-sender digital copying machine. The copying machine having a higher determination level referred herein means a copying machine which pre-stores a large volume of data related to the copy-prohibited images in its own memory 73. Because if the volume of the data related to the copy-prohibited images is small, the copying machine is more likely to determine the subject image as being similar to the copy-prohibited images than recognizing the same as being the copy-prohibited images with 100% accuracy. Alternatively, the copying machine having a higher determination level may be defined as a copying machine that uses a more precise, in other words, CPU time-consuming algorithm, when comparing the input image with the pre-stored copy prohibited images.

According to the above determination criteria, the level of the image determination means provided to each of the digital copying machines 92 and 93 within the image forming system is determined semi-automatically. However, the level may be set at the user's choice.

According to the image forming system of the present embodiment, when a copy-prohibited image is copied by any of the digital copying machines, the digital copying machine can be identified, and such inhibit copy action can be suppressed to achieve an improved security to prevent images from being copied illegally or on bad purpose.

Figure 23:
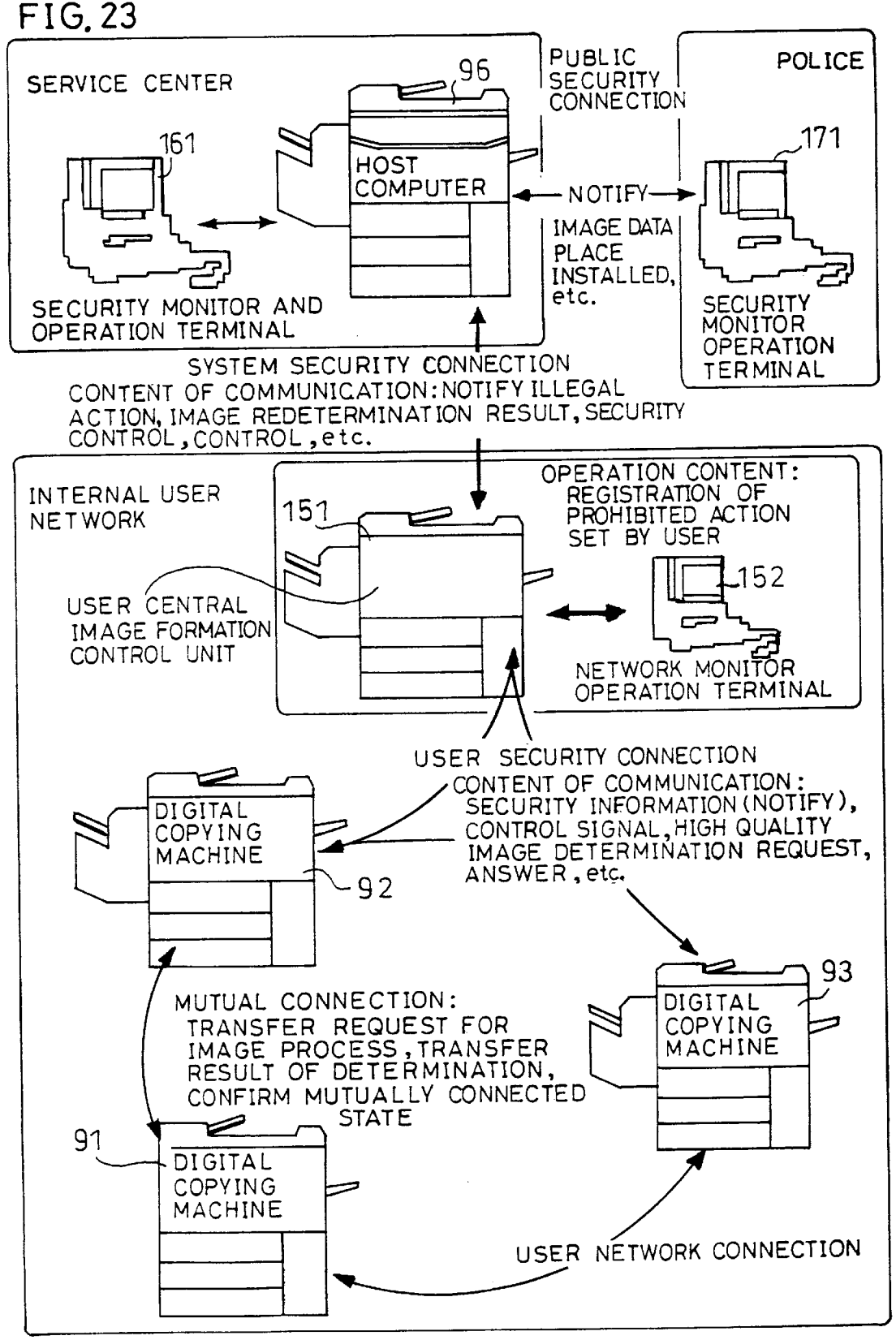
FIG. 23 is an explanatory view showing still another schematic structure of the image forming system.

In order to realize such function, the image forming system may include, for example, as shown in FIG. 23, as a central image formation control unit 151 for a user security connection for controlling a user network connection composed of digital copying machines 91, 92 and 93. As a result, the control against the deletion of the registered prohibit image process by the user setting, the security control on the side of the user for preventing an illegal image copying action can be achieved.

In the described arrangement, a communication is performed with regard to security information, a control signal, a high density image determination request as well as a response to the request between the central image formation control unit 151 and the digital copying machines 91 through 93. The network monitor operation terminal 152 is connected to the central image formation control unit 151, and a registration of prohibit image processing by user setting or a security control, etc., can be input from the network monitor operation terminal 152, and such input can be displayed.

Additionally, it is also permitted to connect the central image formation control unit 151 and the host computer 96 of the service center via the communication device and to the security system. The host computer 96 is provided for a maintenance control or a control of a function and security of the digital copying machines 91, 92, 93 and the central image formation control unit 151 other than the described image processing.

The content of the communication regarding security include: notification of illegal action, the image redetermination and the response to the determination as well as security control, etc. In this host computer 96, an input and a display for controlling the security are permitted by means of the security monitor, and the operation terminal 161. The image forming system may be arranged so as to include a security monitor operation terminal 171 serving as a security monitor for police to be connected to the public security. The content of the security includes image data, installation place, etc.

Specifically, the illegal action as determined on the side of the user is determined once again by the host computer 96 of the service center, and upon determining an occurrence of the illegal action, it is notified and displayed on the security monitor operation terminal 171 installed in the police.

Figure 1:
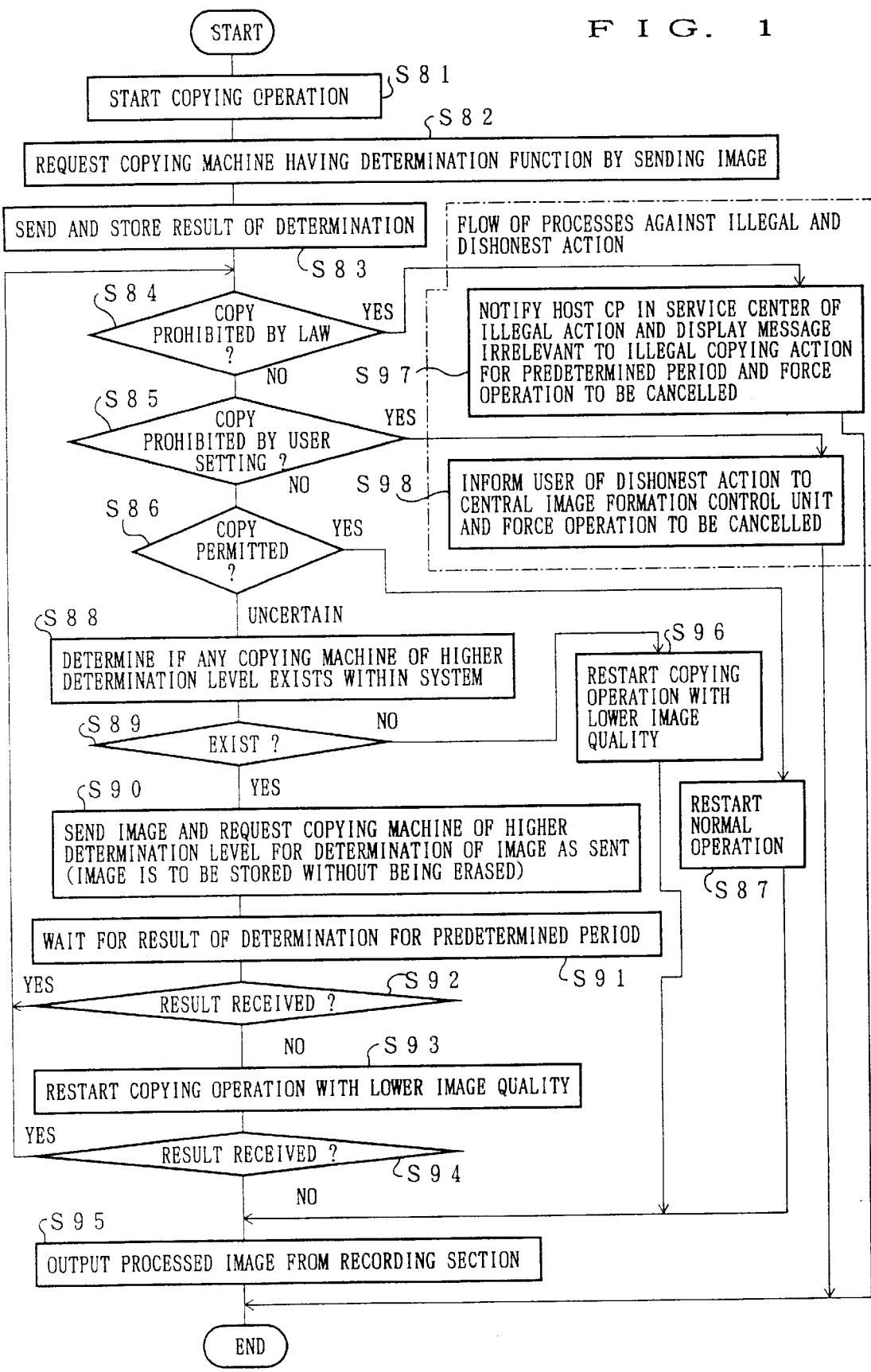
FIG. 1 is a flowchart showing an operation of an image forming system in accordance with one embodiment of the present invention.

The control operation of the image forming system in which the described security system is built will be explained in reference to the flowcharts of FIG. 1. and FIG. 24. FIG. 1 shows an operation against an illegal or dishonest action as an operation of the entire image forming system including the central image formation control device 151 and the host computer 96. The explanations on the processes which are in common with those shown in FIG. 20 and FIG. 22 will be given briefly.

First, when a copying operation is started, for example, by the digital copying machine 91 (S81), and the specific image determination section does not exist in the PCU 74 of the digital copying machine 91, the digital copying machine 91 gives a request for the determination of the image to, for example, the digital copying machine 92 through the communication device (S82).

The digital copying machine 92 determines if an image process on the image data as recited is appropriate, and the determination history data including the result of determination, the name of the apparatus of the requesting end, the requesting data, the document size, the image data, the incidence of illegal action, the user's registration number of prohibit image, the incidence of violating the registered prohibit action by the user setting, the user's wishes as to whether or not the requested function are to be continued in response to a display of cancelling a request, etc., are stored in its memory 73 and returns it to the digital copying machine 91 of the determination requesting end (S83). The storage of the determination history data in the memory 73 of the digital copying machine 92 can be omitted when the result of determination is stored in the memory 73 of the digital copying machine 91. Next, the digital copying machine 91 stores the determination history data in its memory 73. The determination history data of the digital copying machine 92 or the digital copying machine 91 are transferred if requested, for example, from the digital copying machine 92 or the digital copying machine 91. Here, when it is necessary to determine by its own determination function for some reason, such as the case where the digital copying machine 91 does not receive a reply from the digital copying machine 92 within a predetermined time or other digital copying machine 93 being connected is disconnected, a copying operation is performed with a lower image quality (S86 through S95).

When it is determined that the document as set on the document platen 35 of the digital copying machine 91 is prohibited to be copied based on the user setting (S85), the digital copying machine 91 informs the central image formation control unit 151 of the within office network which is connected thereto via the communication device informing the illegal action, and forces the user to complete the image process or displays a message indicating that the image process is completed (S98).

Additionally, the central image formation control unit 151 of the within office network prints out the image data or the determination history data by the image data output section 72 of the own machine or displays a message indicating that an illegal action is carried out by the network monitor operation terminal 152, and is urged to the security controller (S104, S105). Additionally, as shown in the flowchart of FIG. 1, when it is determined that the document which is not appropriate to be processed is prohibited to be copied by law (S84), the digital copying machine 91 informs the service center connected by the communication device via the central image formation control unit 151, and displays a message indicating of an illegal action to the liquid crystal display device 1 in the operational panel 90 of the digital copying machine 91, and forces the image process to be stopped, or displays a message which urges the image process to be displayed (S97).

Figure 24:
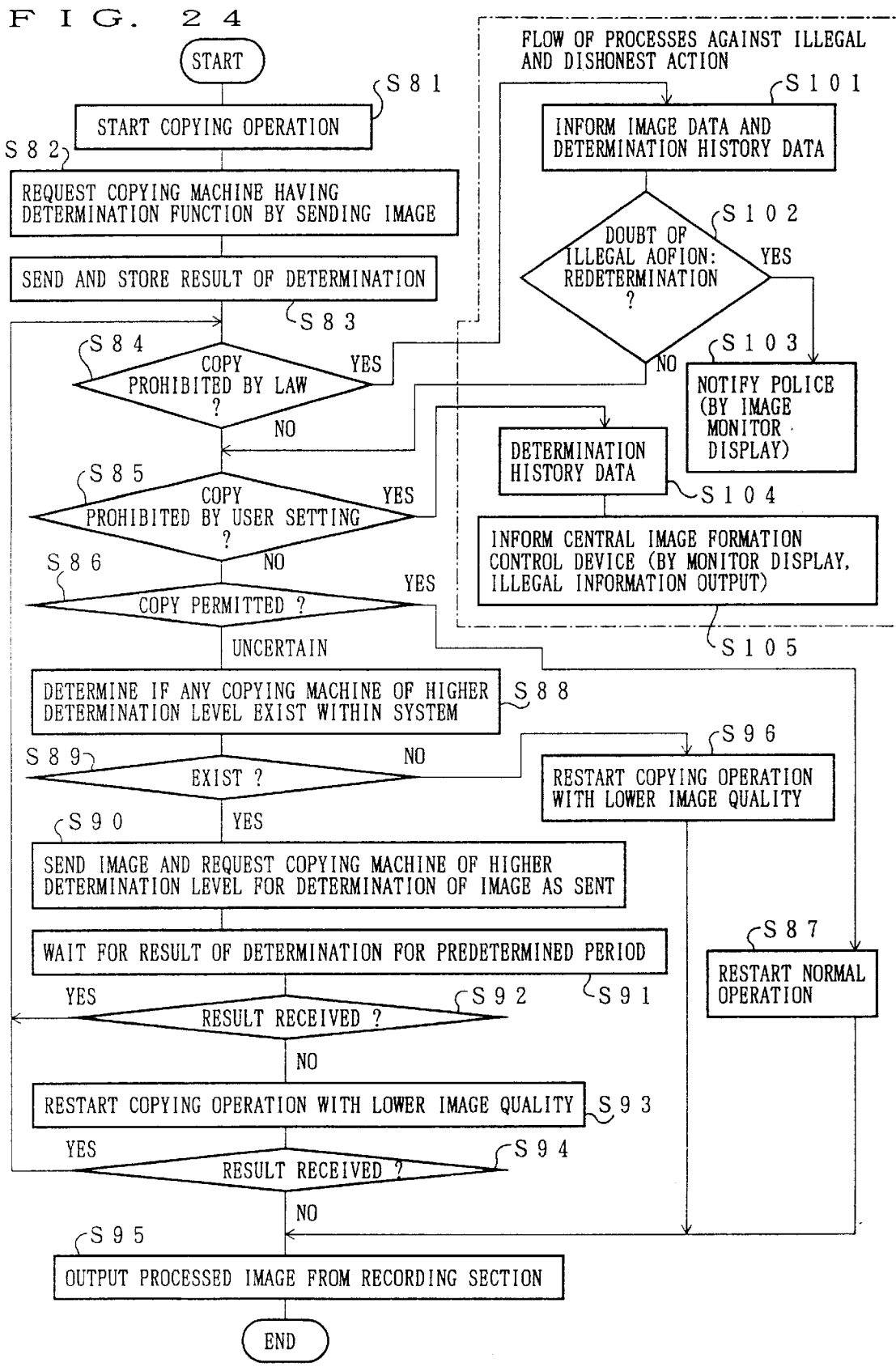
FIG. 24 is a flowchart showing still another operation of the image forming system.

As shown in the flowchart of FIG. 24, the host computer 96 which receives the message recalls the detailed image data which are prohibited to be copied by law and are stored in the memory 73 of the digital copying machine 91 which is carrying out the illegal action via the communication device, and a redetermination is carried out using the image determining function of the highest level within the system possessed by the host computer 96 (S101 and S102).

Figure 25:
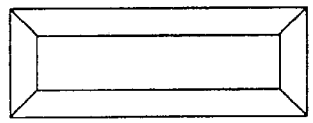
FIG. 25(a) is an explanatory view showing a display state of a liquid crystal display device of a digital copying machine being used while a host computer of a service center is carrying out a redetermination process in the flowchart of FIG. 24.
FIG. 25(b) is an explanatory view showing another display state.
Figure 25:
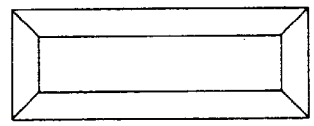

In this state, the host computer 96 gives an instruction for transferring the detailed image data to the digital copying machine 91 of the informing end, and as well as a control signal for temporarily holding a copying operation. The host computer 96 also sends to the liquid crystal display device 1 of the operational panel 90 as shown in FIG. 25(a) and FIG. 25(b), a temporal delay signal which is the control signal for displaying a message irrelevant to the illegal action such as "an image quality is being adjusted" until a result of redetermination is received (see S97 of FIG. 1).

As a result of redetermination, when it is determined that it is appropriate to process the image, a temporal delay signal is cancelled with respect to the digital copying machine 91 of the requesting end of determination as being shifted to S85 and sends an output permitting signal.

On the other hand, when it is determined that it is inappropriate to process the image, the determination history data and the detailed image data are stored in the memory 73 of the host computer 96 as the evidences of the illegal action, and informs the security monitor operation terminal 171 installed in the police authorities concerned of the copy-prohibited image data and the place where the digital copying machine 91 is installed (name of the company, the section of the company) (S103).

The above flowchart shows a control operation of the digital copying machine 91 having an image determination function; however, the present invention is not limited to this. For example, the present invention may be applicable to the case where the digital copying machine 92 determines the image having a simple image determining function.

Figure 26:
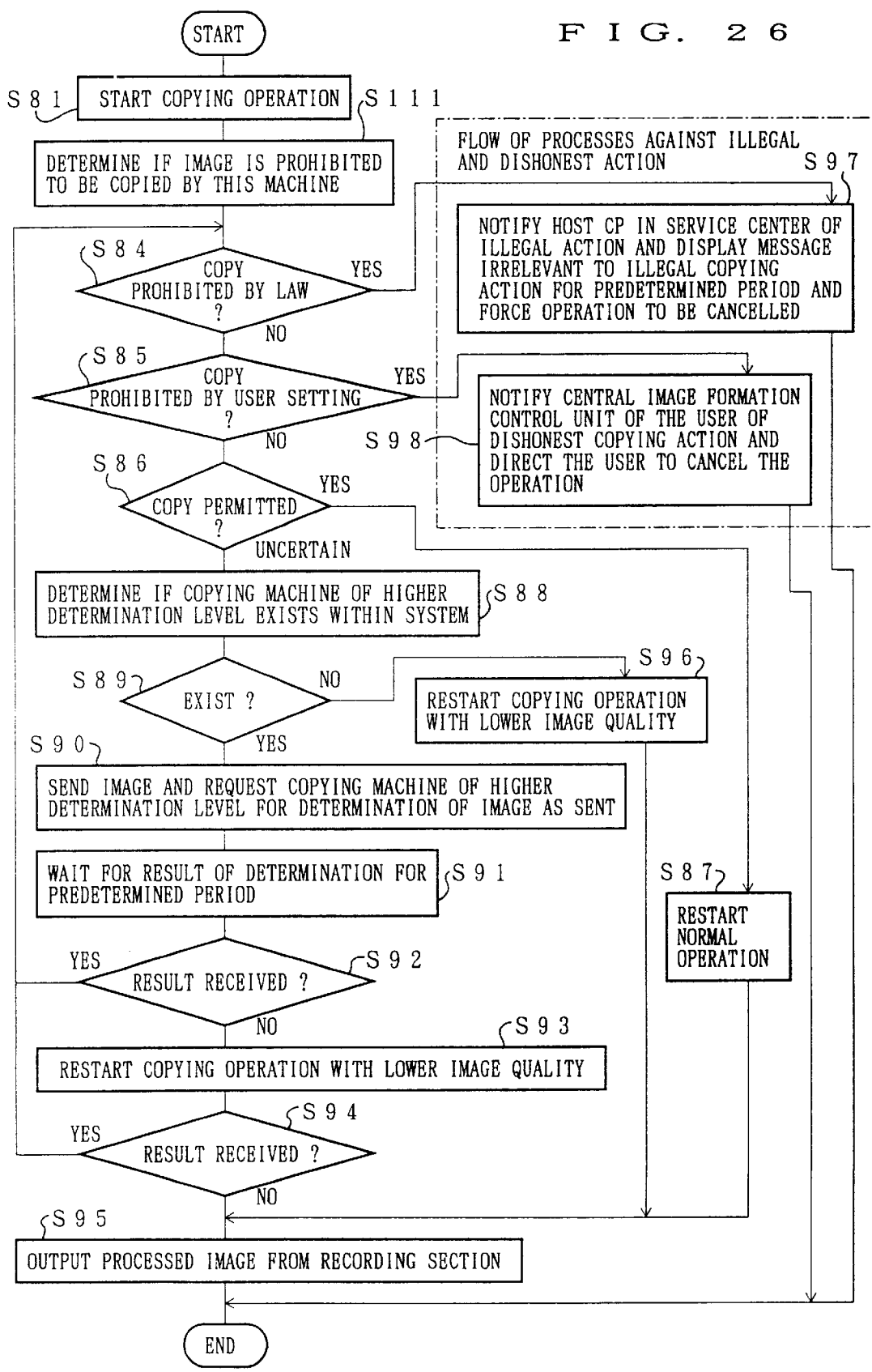
FIG. 26 is a flowchart showing still another operation of the image forming system.
Figure 27:
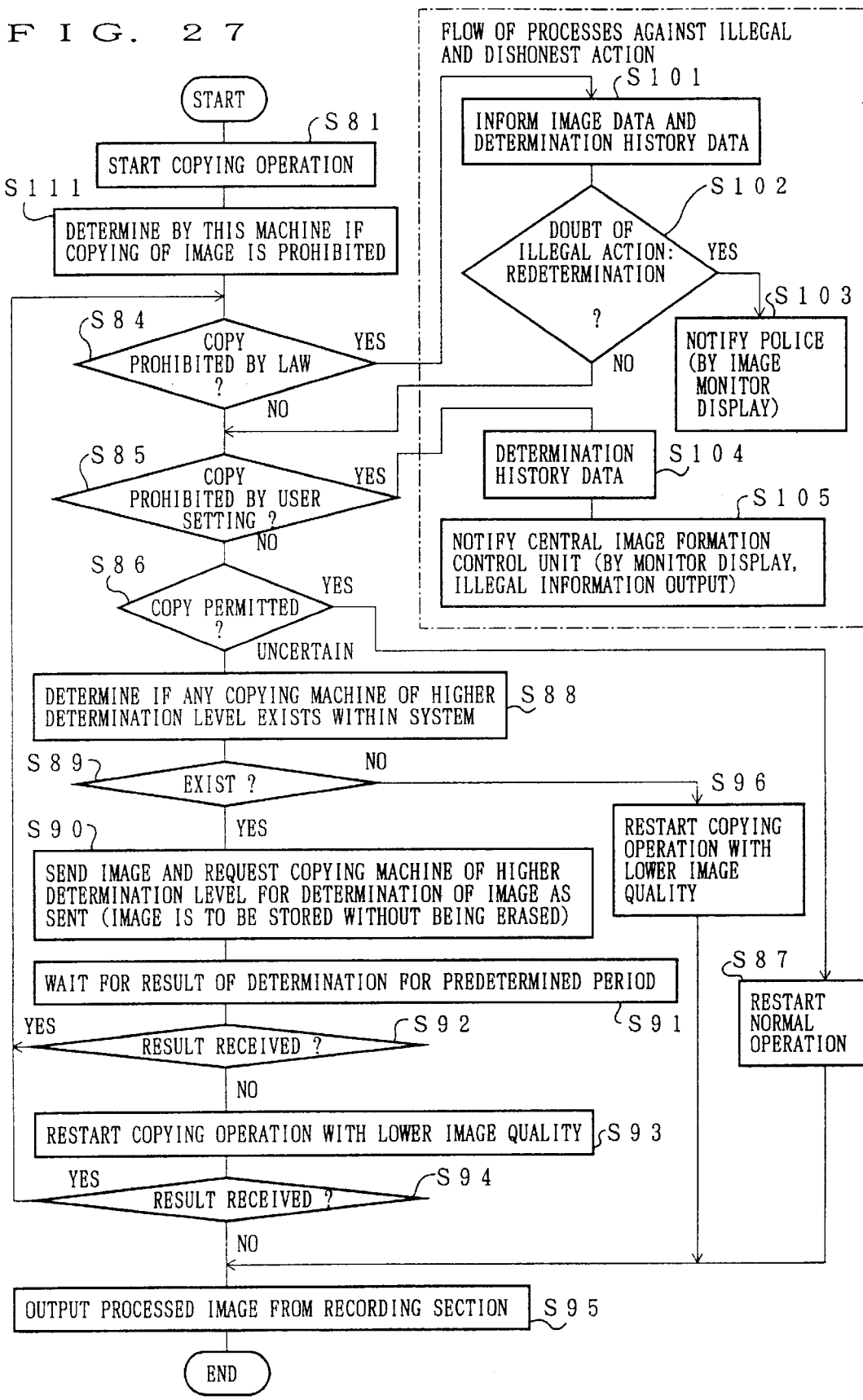
FIG. 27 is a flowchart showing yet still another operation of the image forming system.

As shown in the flowcharts of FIG. 26 and FIG. 27, the digital copying machine 92 performs a determination of the copy-inhibited image by the PCU 74 as its own image data determining section (S81, S111 and S84 through S86), and the result of determination is stored in the memory 73 as the determination history data. In this determination, when it is difficult to determine if the determination corresponds to the illegal action, for example, a request for determination is given to the digital copying machine 93 (S88 through S91). Here, when the determination history data are not sent back from the digital copying machine 93 within a predetermined time, the digital copying machine 92 performs an image process by lowering the image level (S92 through S95).

However, the determination history data are stored in the memory 73 of the digital copying machine 92 so that the determination history data can be transferred to the central image formation control unit 151 and the host computer 96 as requested (S97, S98 and S101 through S105).

As a result, not only in the case where the determination is requested, but also in the case where the determination history data are stored so that the determination history data can be transferred to the central image formation control device 151 and the host computer 96, and the digital copying machine in which an illegal action is often performed can be specified in the digital copying machines 91 through 93, and a suitable security system according to the incidence of an illegal or dishonest action and the contents of such action can be developed.

In the image forming system of the present embodiment, in the digital copying machine 91, when an instruction with regard to the image process by the user is input to the scanner section 31, the PCU 74 stores the image data of the document as read by the scanner unit 40 which is, for example, the image reading section of the digital copying machine 91. The image data are transferred to the digital copying machine 92 via the interface 91a, the communication line 97a and the interface 92a. The digital copying machine 92 performs a predetermined image process to the image data as input, and sends back the processed image data to the digital copying machine 91 via the interface 92a, the communication line 97a and the interface 91a. When the processed image data are input to the digital copying machine 91, the PCU 74 of the digital copying machine 91 supplies the image data to the laser printer section 32. In the laser printer section 32, a visible image is output based on the image data.

As described, according to the image forming system of the present embodiment, since a request for the image process can be given to the digital copying machine 92, in the case where the digital copying machines 92 and 93 which serve as the main image forming apparatuses are connected to the digital copying machine 91 via the interfaces 91a, 92a and 93a, and the communication line 97a, it is not necessarily that each digital copying machine 91 has predetermined image processing functions. Therefore, even when the image processing function of higher level or newer image processing function than the that of digital copying machine 91 becomes available, and such higher function is needed, as long as either one of the digital copying machine 92 and the digital copying machine 93 is provided with the determination function of a higher level, it is not necessarily to purchase new digital copying machine 91. As a result, the financial burden of the user which uses the digital copying machine 91 can be reduced.

However, the image to be processed by the digital copying machine 92 may be prohibited to be reproduced by law such as paper money, marketable securities, or may be prohibited to be copied by user setting.

In order to prevent a processing of the image which is prohibited by law or the user setting, in the present embodiment, the PCU 74 as the image data determining section of the digital copying machine 92 determines if the image data as input are permitted to be processed. Here, whether or not the image data are prohibited to be processed by law or by user setting is determined in reference to the data which have been registered as a prohibit image process.

Additionally, it is not necessarily that the described image data determining function is provided in each of the digital copying machines 91, 92 and 93, and as long as such determination function of higher level is provided in either one of the digital copying machine 92 and the digital copying machine 93, the function can be utilized in the system. Therefore, an increase in cost of the digital copying machine 91 can be avoided.

Furthermore, in the digital copying machine 92 which is not provided with the image data determining function of high level, as a redetermination is carried out by transferring the image data to the digital copying machine 93 provided with the determination function of high level, a generation of an erroneous determination can be prevented, thereby permitting a still improved control of the image process.

Additionally, in the present embodiment, the determination history data including the result of determination are stored at least in either one of the memory 73 of the digital copying machine 91 and the memory 73 of the digital copying machine 92. In the meantime, the digital copying machine 91 and/or the digital copying machine 92 which store the determination history data can transfer the determination history data to other copying machine such as the digital copying machine 93, etc.

Therefore, within the system, the determination history data can be obtained by any one of the digital copying machines 91, 92 and 93. As described, the determination history data of the digital copying machine 92 which performs a processing of an image are stored, and an occurrence of an illegal or dishonest action, the processing condition, etc., are transferred in a form of the determination history data as requested from other machine such as the digital copying machine 93 so as to utilize the result of determination as the determination history data to improve the precision of the determination. As a result, the digital copying machine which frequently performs an illegal or dishonest image process, for example, the digital copying machine 91 can be specified, and an improved security control level such as an installation place of such apparatus, etc., can be achieved, thereby improving a security system.

Additionally, in the arrangement where the result of determination of the image process by the digital copying machine 92 of the request receiving end is stored in the digital copying machine 91 of the requesting end, the digital copying machine 91 can determine the order of selecting the request receiving end with ease based on the determination history data as stored, thereby constituting a network environment which permits a request for processing an image to be given efficiently.

In the image forming system of the present embodiment, the central image formation control unit 151 for controlling the digital copying machines 91, 92 and 93 is provided. Therefore, the image forming system, for example, within the office can be controlled by the central image formation control unit 151.

Here, when carrying out the image process which is prohibited to be processed as registered based on the user setting in the digital copying machine 91, if it is arranged such that the determination history data are not transferred if not requested from other digital copying machine 93, an illegal action cannot be prevented effectively.

However, according to the arrangement of the present embodiment, when processing an image by the digital copying machine 91, if it is determined such that the image data are prohibited to be processed by the user setting, the determination history data including the result of determination are transferred to the central image formation control unit 151.

As a result, by informing the central image formation control unit 151 of the security controller within the system of an occurrence of the illegal action at real time or automatically so as to give a warning against the person which made an attempt of carrying the illegal action can be informed at real time.

Here, the central image formation control unit 151 can print out the image data as transferred by the image data output section 72 as the image output device, and can be displayed on the network monitor operation terminal 152 which is the monitor display device.

Therefore, by arranging such that a warning against an attempt of carrying out a dishonest action, i.e., a processing of copy-prohibited image as registered is displayed on a recording material or a network monitor operation terminal 152, even with respect to the security controller who are not familiar with the operation of the central image formation control unit 151, the warning can be given with ease.

Additionally, the image formation system in accordance with the present embodiment includes a host computer 96 as the centralized control device in a service center to be connected to the central image formation control unit 151 via the telephone line 97 (second communication device).

Namely, an illegal image processing action of the document such as paper money, marketable securities, etc., even if it fails in attempt due to paper jam in the image process, such action should be prevented absolutely, and the person who made such an attempt should be punished.

Therefore, it is preferable to arranged such that other than the security control within the user system, a manufacturer of the image forming system transfers the determination history data to the host computer 96 of the service center via the central image formation control unit 151 in order to effectively cope with the illegal action and to prevent illegal action, and the determination history data are transferred to the host computer 96 of the service center via the central image formation control unit 151.

As described, with the network connection which allows a communication of the data on the illegal action which the person who makes an attempt of carrying out such illegal action cannot see, the informing of the illegal operation can be supported, thereby permitting the control of the security system of a higher level.

Additionally, in the image forming system of the present embodiment, the host computer 96 of the service center which receives the determination history data indicating that the image data which is to be copied by the copying machine 91 are prohibited to be processed by law carries out a determination for determining if the determination history data are correct.

When carrying out the redetermination, the image data as stored in the memory 73 of the digital copying machine 91 are called to carry out a redetermination for determining if the image data are permitted to be processed by the PCU 74 as the central image data determining section based on the image data as recalled.

By arranging such that the image data of original precise image data are called from the memory 73 of the digital copying machine 91 which carries out the illegal action, and the redetermination is carried out by the host computer 96, it is permitted to request the determination of the illegal action to be carefully dealt with to the determination function of a higher level than that of the image data determining section of the digital copying machine 92 of the user system. For example, by the security monitor connected to the host computer 96 and the monitor screen of the operation terminal 161, the image may be determined by the security control operator or the police, thereby preventing a generation of an erroneous determination.

In the image formation system of the present embodiment, as described, in the case where the host computer 96 carries out a redetermination based on the image data as called from the memory 73 of the digital copying machine 91, the host computer 96 sends the control signal for temporarily holding the formation of the image with respect to the digital copying machine 91. In the meantime, with respect to the digital copying machine 91, a request for displaying a message indicating a message "image quality is being adjusted" which is irrelevant to the redetermination is given with respect to the digital copying machine 91.

For this reason, during the redetermination of the image data which are prohibited to be processed by law which should be carefully dealt with, the person who made an attempt of carrying out the illegal action can be specified and the time required for arresting the person can be ensured.

According to the image forming system of the present embodiment, as a result of redetermination by the host computer 96, if it is determined that it is not illegal to process the image data, the host computer 96 outputs an output permitting signal to the digital copying machine 91.

As a result, if a determination error occurs in the image data determining section of the user system, after correcting the error, the image process is restarted, thereby the user can continue the image forming operation without a failure.

The image forming system of the present embodiment includes a security monitor operation terminal 171 of the police authorities concerned to be connected to the host computer 96 by the telephone line 97 (third communication device).

In the redetermination of the central control image data determining section of the host computer 96, when it is determined that the action of processing the image data is illegal, the host computer 96 informs this to the security monitor operation terminal 171 of the police authorities concerned.

As a result, the police is immediately informed of the illegal action being conducted, and make this information open to others when necessary.

Additionally, by always monitoring by the security monitor operation terminal 171 of the police, the illegal image processing action can be prevented, and the secondary crime associated with the illegal image processing action can be prevented.

As described, the first image forming system of the present invention is characterized by including: a plurality of image forming apparatuses including a main image forming apparatus and a sub image forming apparatus; a communication device for permitting image data to be transmitted and received between the main image forming apparatus and the sub image forming apparatus by connecting them, wherein the sub image forming apparatus includes: an image input section for inputting the image data; a sub image data storage section for storing the image data; a sub image processing section for applying a predetermined image process to the image data; an image recording section for forming a visible image based on the image data as stored in the sub image storage section; and a sub control section for transferring the image data to the main image forming apparatus and sending the image data as processed by the main image forming apparatus to the image recording section, the main image forming apparatus includes: the main image processing section for applying a predetermined process to the image data; an image data determining section for determining if the image data as input via the communication device are prohibited by law or by user setting; and a main control section for sending back the determination history data including a result of determination by the image data determining section to the sub image forming apparatus, and the determination history data are stored in at least one of the sub image data memory section and the main image forming section of the main image forming apparatus, and the sub image forming section and/or the main image forming section transfers the determination history data to other sub image forming apparatus and/or main image forming apparatus.

According to the described arrangement, in the sub image forming apparatus, when an instruction for processing an image is input by the user in an image input section, the sub control section stores the image data of the document as read, for example, by the image reading section of the sub image data storage section. Further, the image data are transferred to the main image forming apparatus via the communication device.

The main image forming apparatus applies a predetermined process to the image data as input, and returns the image data as processed to the sub image forming apparatus via the communication device. Then, when the image data as processed are input to the sub image forming apparatus, the sub control section of the sub image forming apparatus supplies the image data to the image recording section. The image recording section outputs a visible image based on the image data.

As described, according to the described arrangement of the image forming system, as it is permitted to request the main image forming apparatus to process the image, in the case where a plurality of main image forming apparatuses are connected to the sub image forming apparatus via the communication device, it is not necessarily that each image forming apparatus has a predetermined image processing function.

Therefore, even when the image processing function of higher level or more updated image processing function than that of each image forming apparatus is developed, and such higher function as developed is needed, as long as the main image forming apparatus has the function, it is not necessarily to purchase new image forming apparatus. As a result, the financial burden of the user which uses the image forming apparatus can be reduced.

The determination history data including the result of determination, the name of the apparatus of the requesting end, the requesting data, the document size, the image data, the incidence of illegal action, the user's prohibit registration number, the incidence of violating the registered prohibit action based on the user setting are sent back to the sub image forming apparatus.

Accordingly, when the determination history data indicate that it is illegal to process the image data, the sub image forming apparatus prohibits the formation of a visible image of such prohibit image data by displaying a message indicative of the illegal action for the user, and the illegal image processing action can be prevented with respect to the image data which are prohibited to be processed by law or by user setting, thereby preventing an occurrence of an illegal action or a dishonest action of processing the image based on the user setting.

Moreover, since the described image data determining function is required to be provided only in the image forming apparatus which carries out a determination process, an increase in cost of each image forming apparatus can be eliminated.

Further, even in the image forming apparatus which is not provided with an image data determining function of high level, by transferring the image data to the main image forming apparatus provided with a determination function of a higher level, an occurrence of an erroneous determination can be prevented, and a control of an image process of higher level can be performed.

In the present invention, the determination history data including the result of determination are stored at least either one of the sub image data storage section and the main image data storage section of the main image forming apparatus, and the sub image forming device and/or the main image forming apparatus which stores the determination history data transfers the determination history data to other sub image forming apparatus and the main image forming apparatus.

Therefore, the determination history data can be obtained by any of the sub image forming apparatus and the main image forming apparatus. Then, as described, the determination history data of the main image forming apparatus which performs a processing of an image are stored, and an occurrence of an illegal or dishonest action, the processing condition, etc., are transferred in a form of the determination history data as requested from other image forming apparatus so as to utilize the result of determination as the determination history data to improve the precision of the determination. As a result, the image forming apparatus which frequently performs an illegal or dishonest image process can be specified, and an improved security control level such as an installation place of such apparatus, etc., can be achieved, thereby improving a security system.

Additionally, when the result of determination of the image process by the main image forming apparatus of the requesting receiving end is stored in the sub image forming apparatus of the requesting end, the priority order of selecting an apparatus of a receiving end of a request can be determined with ease based on many determination history data, thereby constituting a network environment which enables a request for processing an image to be given in an effective way.

The second image forming system in accordance with the present invention is characterized by including: a plurality of image forming apparatuses including a main image forming apparatus and a sub image forming apparatus; a communication device for permitting image data to be transmitted and received between the main image forming apparatus and the sub image forming apparatus by connecting them, wherein the sub image forming apparatus includes: an image input section for inputting the image data; a sub image data storage section for storing the image data; a sub image processing section for applying a predetermined image process to the image data; an image recording section for forming a visible image based on the image data stored in the sub image storage section; and a sub control section for transferring the image data to the main image forming apparatus and supplying the image data as processed by the main image forming apparatus to the image recording section, the main image forming apparatus includes: the main image processing section for applying a predetermined process to the image data; an image data determining section for determining if the image data as input via the communication device are prohibited to be copied by law or by the user setting; and a main control section for sending back the determination history data including a result of determination by the image data determining section to the sub image forming apparatus, and the sub image forming apparatus stores the determination history data in the sub image data memory section when the determination history data are returned from the main image forming apparatus, a central image formation control section for controlling both the main image forming apparatus and the sub image forming apparatus is provided within the system, and when the determination history data indicating that the image data are prohibited to be processed are returned from the main image forming apparatus, if the image data are prohibited to be processed by the user setting, the determination history data are transferred to the central image formation control device.

According to the present invention, the determination history data including a result of determination as returned from the main image forming apparatus are stored in the sub image data storage section of the sub image forming apparatus.

Additionally, the central image formation control device is provided for organizing and controlling both the main image forming apparatus and the sub image forming apparatus. Therefore, by the central image formation control device, for example, the image forming system within the office can be controlled.

Here, when the registered image process as an inhibit image process by the user setting in the sub image forming apparatus is to be carried out, if the determination history data are not transferred as long as a request for transferring it is given from other sub image forming apparatus or the main image forming apparatus within the system, a dishonest action cannot be prevented sufficiently.

However, according to the image process by the sub image forming apparatus, in the case where the image data as registered by the user setting is determined to be the image data, the determination history data including the result of determination are transferred to the central image forming apparatus from the sub image forming apparatus.

As a result, by informing the central image formation control unit of the security controller within the system of an occurrence of the illegal action at real time or automatically so as to give a warning against the person which made an attempt of carrying the illegal action can be informed at real time.

The third image forming system of the present invention based on the second image forming system is characterized in that: a centralized control device of the service center to be connected to the central image formation control device via the communication device is provided in the system, and when the determination history data indicating that the image data are prohibited to be processed are returned from the main image forming apparatus, if the image data are prohibited to be processed by law, the determination history data are transferred to the centralized control device via the central image formation control device.

In the described arrangement of the present invention, the centralized control device of the service center is connected to the central image formation control device by the communication device.

Namely, an illegal image processing action of the document such as paper money, marketable securities, etc., even if it fails in attempt due to paper jam in the image process, such action should be prevented absolutely, and the person who made such an attempt should be punished.

Therefore, it is preferable to arranged such that other than the security control within the user system, a manufacturer of the image forming system transfers the determination history data to the centralized control device in the service center via the central image formation control unit in order to effectively cope with the illegal action and to prevent illegal action, and the determination history data are transferred to the centralized control device in the service center via the central image formation control unit.

As described, with the network connection which allows a communication of the data on the illegal action which the person who makes an attempt of carrying out such illegal action cannot see, the informing of the illegal operation can be supported, thereby permitting the control of the security system of a higher level.

The fourth image forming system of the present invention based on the third image forming system is characterized in that the centralized control device includes a centralized control image data determining section for determining if the image data as input via the communication device are prohibited to be processed, and the centralized control device redetermines if the image data are prohibited to be processed by the centralized control image data determining section by calling the image data stored in the sub image data storage section of the sub image forming apparatus.

According to the present invention, the centralized control device of the service center which receives the determination history data indicating that an action of processing the image data which are to be carried out by the sub image forming apparatus within the user's system is prohibited by law determines if the determination history data are correct.

By arranging such that the image data of original precise image data are called from the sub image data storage section of the sub image forming apparatus which carries out the illegal action, and the redetermination is carried out by the centralized control device, it is permitted to request the determination of the illegal action to be carefully dealt with to the determination function of a higher level than that of the image data determining section of the main image forming apparatus in the user system. For example, by the monitor screen connected to the centralized control device and the monitor image of the security control operator or the police, the image may be determined by the security control operator or the police, thereby preventing a generation of an erroneous determination.

The fifth image forming system of the present invention having the fourth image forming system is characterized in that a security monitor of police authorities concerned to be connected to the centralized control device via the communication device is provided within the system, and the centralized control device informs the security monitor of a result of determination by the centralized control image data determining section when the result indicates that the image data are prohibited to be processed by law by transferring the result to the security monitor.

According to the present invention, a security monitor of the police authorities concerned is provided within the system. The security monitor is connected to the centralized control device by the communication device.

In the redetermination by the central control image data determining section, when it is determined that an action of processing the image data is illegal, the centralized control device informs the security monitor of the police authorities concerned of the result of determination.

As a result, the police can be informed of that an attempt of an illegal action is made by making such information open to the police immediately.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An image forming system, comprising:
   a plurality of image forming apparatuses including at least one main image forming apparatus and at least one sub image forming apparatus; and
   a communication device for connecting said main image forming apparatus and said sub image forming apparatus to allow data to be transmitted and received between them,
   wherein said sub image forming apparatus includes a sub control section for transmitting image data to said main image forming apparatus via said communication device and requesting said main image forming apparatus to determine if the image data as transmitted are prohibited to be copied,
   said main image forming apparatus includes an image data determining section for determining if said image data as received via said communication device are prohibited to be copied and a main control section for transmitting determination history data including a result of determination via said communication device; and
   at least either one of said main image forming apparatus and said sub image forming apparatus includes memory means for storing said determination history data and transfer means for transferring said determination history data to other image forming apparatus; and
   wherein each of said at least one main image forming apparatus further comprises means for determining whether or not a main image forming apparatus having a higher determination level than itself exists in said system; and
   if it is determined that there is a main image forming apparatus having a higher determination level than the one of said at least one main image forming apparatus then in receipt of the image data and request for determination, the main control section of the one of said at least one main image forming apparatus then in receipt of said image data and request for determination transmits the determination history data generated thereby to a main image forming apparatus having a higher determination level for further processing such that the last generated determination history data by one of said at least one main image forming apparatus is generated by the one of the at least one main image forming apparatus having the highest determination level, arid the last generated determination history data is the determination history data communicated to the one of said sub image forming; devices from which said image data arid request originated.

2. The image forming system as set forth in claim 1, wherein said sub image forming apparatus includes:
   an image input section for inputting image data;
   a sub image data storage section for storing the image data;
   a sub image processing section for processing the image data; and
   an image recording section for forming a visual image based on the image data as stored in said sub image data storage section.

3. The image forming system as set forth in claim 1, wherein:
   said image data determining section includes a copy-prohibited image storage section for storing copy-prohibited image data, and determines if the image data to be determined are prohibited to be copied based on said copy-prohibited image data as stored.

4. The image forming system as set forth in claim 3, wherein:
   said copy-prohibited image data stored in said copy prohibited image storage section are prohibited to be reproduced by law.

5. The image forming system as set forth in claim 3, wherein:
   copy-prohibited image data stored in said copy prohibited image storage section are prohibited to be copied based on user setting.

6. The image forming system as set forth in claim 1, wherein:
   an image forming apparatus having the determination history data stored in said memory means transfers the determination history data to other image forming apparatus based on a request from other image forming apparatus.

7. The image forming system as set forth in claim 2, wherein:
   said sub image forming apparatus outputs a visible image from said image recording section with a lower image quality level if the determination history data are not received within a predetermined time after requesting the main image forming apparatus to determine if the image data are prohibited to be copied.

8. The image forming system as set forth in claim 1, wherein:

said sub image forming apparatus includes a second image data determining section for determining if the image data are prohibited to be copied, said second image data determining section having a determination level which is lower than that of said image data determining section of said main image forming section.

9. The image forming system as set forth in claim 8, wherein:

said sub image forming apparatus stores a result of determination by said second image data determining section in its memory means as the determination history data and transfers the determination history data as requested from other image forming apparatus if the determination history data are not received within a predetermined time after requesting said main image forming apparatus to determine if the image data are prohibited to be copied.

10. The image forming system as set forth in claim 1, wherein:

said sub image forming apparatus stores the determination history data in its memory means and transfers the determination history data to other image forming apparatus as requested from other image forming apparatus if the determination history data are not received within a predetermined time after requesting said main image forming apparatus to determine if the image data are prohibited to be copied.

11. The image forming apparatus as set forth in claim 1, further comprising:

a central image formation control unit for organizing and controlling said main image forming apparatus and said sub image forming apparatus.

12. The image forming system as set forth in claim 11, wherein:

said sub image forming apparatus transfers the determination history data to said central image formation control unit when a result of determination indicating that the image data are prohibited to be copied is received from said main image forming apparatus.

13. The image forming system as set forth in claim 12, wherein:

said central image formation control unit includes output means for printing out the determination history data as received.

14. The image forming system as set forth in claim 12, wherein:

said central image formation control unit includes display means for monitor-displaying the determination history data as received.

15. The image forming system as set forth in claim 11, further comprising:

a centralized control device for centrally controlling data on an inhibit copy action;

a second communication device for allowing communication between said central image formation control unit and said centralized control device, wherein said sub image forming apparatus transfers said determination history data to said centralized control device via said central image formation control unit when said image data are specific image data upon receiving said determination history data including a result of determination indicating that the image data are prohibited to be copied from said main image forming apparatus.

16. The image forming system as set forth in claim 15, wherein:

said specific image data are prohibited to be reproduced by law.

17. The image forming system as set forth in claim 15, wherein:

said centralized control device includes a centralized image data determining section for determining if the image data as input via said second communication device are prohibited to be copied, and receives the image data to be determined from said sub image forming apparatus and redetermines if the image data as received are prohibited to be copied using said centralized image data determining section.

18. The image forming system as set forth in claim 17, wherein:

said centralized control device sends to said sub image forming apparatus a control signal for temporarily holding an image forming operation of said sub image forming apparatus while a redetermination is being carried out; and said sub image forming apparatus temporarily holds the image forming operation based on the control signal.

19. The image forming system as set forth in claim 18, wherein:

said sub image forming apparatus includes a display section for displaying a message indicating that a process irrelevant to the redetermination is being performed while the image forming operation is being temporarily held based on the control signal.

20. The image forming system as set forth in claim 19, wherein:

said display section displays a message indicating that an image quality is being adjusted.

21. The image forming system as set forth in claim 18, wherein:

said centralized control device sends a second control signal for cancelling a hold state of the image forming operation of said sub image forming apparatus if the image data are not prohibited to be copied as a result of redetermination, and said sub image forming apparatus restarts an image forming operation based on the second control signal.

22. The image forming system as set forth in claim 17, further comprising:

a security monitor for monitoring data on an inhibit copy action; and a third communication device for allowing communicating between said centralized control device and said security monitor, wherein said centralized control device informs said security monitor of a result of determination as received if said centralized image data determination control section determines that the image data are prohibited to be copied.

23. An image forming system, comprising:

a plurality of image forming apparatuses including a main image forming apparatus and a sub image forming apparatus;

a communication device for permitting image data to be transmitted and received between said main image forming apparatus and said sub image forming apparatus by connecting them, wherein:

(i) said sub image forming apparatus includes:

an image input section for inputting the image data, a sub image data storage section for storing the image data;

a sub image processing section for applying a predetermined image process to the image data;

an image recording section for forming a visible image based on the image data stored in the sub image storage section; and a sub control section for transferring the image data to said main image forming apparatus and supplying the image data as processed by the main image forming apparatus to be sent to said image recording section, (ii) said main image forming apparatus includes:

said main imaging processing section for applying a predetermined process to the image data;

an image data determining section for determining if the image data as input via said communication device are prohibited to be copied by law or by user setting; and a main control section for sending back determination history data including a result of determination by said image data determining section to said sub image forming apparatus, (iii) said determination data are stored in at least one of said sub image data memory section and the main image forming section of said main image forming apparatus, and said sub image forming section and/or said main image forming section transfers the determination history data to other sub image forming apparatus and/or main image forming apparatus; and (iv) said main image forming apparatus includes at least one main image forming apparatus;

said sub image forming apparatus includes at least one sub image forming apparatus;

each of said at least one main image forming apparatus further comprises means for determining whether or not a main image forming apparatus having a higher determination level than itself exists in said system; and if it is determined that there is a main image forming apparatus having a higher determination level than the one of said at least one main image forming apparatus then in receipt of the image data and request for determination, the main control section of the one of said at least one main image forming apparatus then in receipt of said image data and request for determination transmits the determination history data generated thereby to a main image forming apparatus having a higher determination level for further processing such that the last generated determination history data by one of said at least one main image forming apparatus is generated by the one of the at least one main image forming apparatus having the highest determination level, and the last generated determination history data is the determination history data communicated to the one of said sub image forming devices from which said image data and request originated.

24. An image forming system, comprising:

a plurality of image forming apparatuses including a main image forming apparatus and a sub image forming apparatus;

a communication device for permitting image data to be transmitted and received between said main image forming apparatus and said sub image forming apparatus by connecting them, wherein:

(i) said sub image forming apparatus includes:

an image input section for inputting the image data, a sub image data storage section for storing the image data;

a sub image processing section for applying a predetermined image process to the image data;

an image recording section for forming a visible image based on the image data stored in the sub image storage section; and a sub control section for transferring the image data to said main image forming apparatus and supplying the image data as processed by the main image forming apparatus to be sent to said image recording section, (ii) said main image forming apparatus includes:

said main imaging processing section for applying a predetermined process to the image data;

an image data determining section for determining if the image data as input via said communication device are prohibited to be copied by law or by user setting; and a main control section for sending back determination history data including a result of determination by said image data determining section to said sub image forming apparatus, (iii) said main image forming apparatus includes at least one main image forming apparatus;

said sub image forming apparatus includes at least one sub image forming apparatus;

each of said at least one main image forming apparatus further comprises means for determining whether or not a main image forming apparatus having a higher determination level than itself exists in said system; and if it is determined that there is a main image forming apparatus having a higher determination level than the one of said at least one main image forming apparatus then in receipt of the image data and request for determination, the main control section of the one of said at least one main image forming apparatus then in receipt of said image data and request for determination transmits the determination history data generated thereby to a main image forming apparatus having a higher determination level for further processing such that the last generated determination history data by one of said at least one main image forming apparatus is generated by the one of the at least one main image forming apparatus having the highest determination level, and the last generated determination history data is the determination history data communicated to the one of said sub image forming devices from which said image data and request originated (iv) said sub image forming apparatus stores the determination history data in said sub image data memory section upon receiving said determination history data from said main image forming apparatus, and (v) a central image control unit for controlling both said main image forming apparatus and said sub image forming apparatus is provided within said system such that when the determination history data indicating that the image data are prohibited to be processed are returned from said main image forming apparatus, if the image data are prohibited to be processed by user setting, the determination history data are transferred to said central information control unit.

25. The image forming system as set forth in claim 24, wherein:

a centralized control device of the service center to be connected to said central image formation control unit via said communication device is provided within said system, when the determination history data indicating that the image data are prohibited to be processed are returned from said main image forming apparatus, if the image data are prohibited to be processed by law, the determination history data are transferred to said centralized control device via said central image formation control unit.

26. The image forming system as set forth in claim 25, wherein:

said centralized control device includes a centralized control image data determining section for determining if the image data as input via said communication device are prohibited to be processed, and said centralized control device redetermines if the image data are prohibited to be processed by the centralized control image data determining section by calling the image data stored in said sub image data storage section of said sub image forming apparatus.

27. The image forming system as set forth in claim 26, further comprising:

a security monitor of police authorities concerned to be connected to said centralized control device via said communication device is provided within said system, and said centralized control device informs said security monitor of a result of determination by said centralized control image data determining section if the result indicates that the image data are prohibited to be processed by law by transferring the result said security monitor.

* * * * *

UNITED STATES PATENT AND TRADEMARK OFFICE
CERTIFICATE OF CORRECTION

PATENT NO.   : 6,185,321 B1
DATED        : February 6, 2001
INVENTOR(S)  : Tamotsu Fukushima, Yasuhiro Nakai, Masakatsu Nakamura, Syoichiro Yoshiura, and Hidetomo Nishiyama It is certified that error appears in the above-identified patent and that said Letters Patent is hereby corrected as shown below:

Title page,
Item [75] Inventors section, please change "Hidemoto Nishiyama" to
-- Hidetomo Nishiyama --

Signed and Sealed this

Second Day of October, 2001

*Attest:*

NICHOLAS P. GODICI
*Attesting Officer*     *Acting Director of the United States Patent and Trademark Office*